US012719729B2

(12) United States Patent
Shim et al.

(10) Patent No.: US 12,719,729 B2
(45) Date of Patent: Aug. 25, 2026

(54) APPARATUS AND METHOD FOR PERFORMING COMMUNICATION BASED ON TIMING ALIGNMENT ERROR (TAE) IN WIRELESS COMMUNICATION SYSTEM

(71) Applicant: SAMSUNG ELECTRONICS CO., LTD., Suwon-si (KR)

(72) Inventors: Seijoon Shim, Suwon-si (KR); Jonghwan Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 481 days.

(21) Appl. No.: 18/301,434

(22) Filed: Apr. 17, 2023

(65) Prior Publication Data

US 2023/0254196 A1 Aug. 10, 2023

Related U.S. Application Data

(63) Continuation of application No. PCT/KR2022/005435, filed on Apr. 14, 2022.

(30) Foreign Application Priority Data

Apr. 14, 2021 (KR) ........................ 10-2021-0048539

(51) Int. Cl.
*H04L 27/26* (2006.01)
*H04B 17/345* (2015.01)
(Continued)

(52) U.S. Cl.
CPC ....... *H04L 27/2691* (2013.01); *H04B 17/345* (2015.01); *H04L 25/0242* (2013.01);
(Continued)

(58) Field of Classification Search
None
See application file for complete search history.

(56) References Cited

U.S. PATENT DOCUMENTS 10,306,408 B2 5/2019 Zhu et al.
10,355,895 B2 7/2019 Barbieri et al.
(Continued)

FOREIGN PATENT DOCUMENTS

CN 109246721 A 1/2019
JP 6636542 B2 1/2020
(Continued)

OTHER PUBLICATIONS

Extended European Search Report dated Jun. 18, 2024 issued in European Patent Application No. 22788478.0.
(Continued)

*Primary Examiner* — Gerald A Smarth
(74) *Attorney, Agent, or Firm* — Nixon & Vanderhye, P.C.

(57) ABSTRACT

The disclosure relates to a 5G or 6G communication system for supporting a higher data transmission rate. The present disclosure relates to a 5th generation (5G) or pre-5G communication system for supporting a higher data transmission rate after a 4th generation (4G) communication system such as long-term evolution (LTE). A method of operating a base station according to various embodiments of the present disclosure may include: receiving channel information from at least one terminal, obtaining channel interference information based on the channel information, obtaining a precoder based on the channel interference information, and transmitting a transmit signal to the at least one terminal based on the precoder, the channel interference information may include timing alignment error (TAE) interference and multi-user interference, and the TAE interference may be determined based on a number of first radio access technology (RAT) symbols and a number of second RAT symbols allocated to the transmit signal.

19 Claims, 13 Drawing Sheets

(51) Int. Cl.

| | |
|---|---|
| ***H04L 25/02*** | (2006.01) |
| ***H04W 16/14*** | (2009.01) |
| ***H04W 72/541*** | (2023.01) |

(52) U.S. Cl.

CPC ....... *H04L 27/26025* (2021.01); *H04W 16/14* (2013.01); *H04W 72/541* (2023.01)

(56) References Cited

U.S. PATENT DOCUMENTS

| | | | |
|---|---|---|---|
| 10,389,455 | B2 | 8/2019 | Elfström et al. |
| 10,756,799 | B2 * | 8/2020 | Noh ........................ H04L 5/005 |
| 2012/0176980 | A1 | 7/2012 | Moon et al. |
| 2014/0192921 | A1 | 7/2014 | Wang et al. |
| 2015/0181589 | A1 | 6/2015 | Luo et al. |
| 2015/0372741 | A1 | 12/2015 | Kim et al. |
| 2019/0150132 | A1 | 5/2019 | Bala et al. |
| 2019/0165912 | A1 | 5/2019 | Nammi et al. |
| 2019/0229873 | A1 | 7/2019 | Enescu et al. |
| 2019/0268186 | A1 | 8/2019 | Maleki et al. |
| 2019/0313356 | A1 * | 10/2019 | Sandgren ............ H04L 27/2678 |
| 2019/0342015 | A1 | 11/2019 | Elfström et al. |
| 2019/0379488 | A1 | 12/2019 | Demir et al. |

FOREIGN PATENT DOCUMENTS

| | | | | |
|---|---|---|---|---|
| KR | 20110137108 | A | 12/2011 | |
| KR | 10-2016-0132595 | | 11/2016 | |
| KR | 20170135549 | A | 12/2017 | |
| KR | 10-2018-0111915 | | 10/2018 | |
| WO | 2019164430 | A1 | 8/2019 | |
| WO | 2020/226644 | | 11/2020 | |
| WO | 2021/022391 | | 2/2021 | |
| WO | WO-2022212201 | A1 * | 10/2022 | ........... H04L 5/0048 |

OTHER PUBLICATIONS

3GPP TSG-RAN, “Discussion the test model in DSS”, Meeting Notes, Meeting #96, Aug. 17-28, 2020, 8 pages.

3GPP TSG RAN; Study on supporting NR from 52.6 GHz to 71 GHZ, Technical Report, Mar. 2021, 161 pages, 3GPP TR 38.808.

Cheng et al., “Analysis and Cancellation of Mixed-Numerologies Interference for Massive Mimo-Ofdm Ul”, Hal Open Science, Submitted May 3, 2021, pp. 470-474.

Choi et al., “A Transceiver Design for Spectrum Sharing in Mixed Numerology Environments”, IEEE Transactions On Wireless Communications, No. 5 May 5, 2019, 15 pages, vol. 18.

MRTD and MTTD requirements for Intra-band synchronous EN-DC, Feb. 25-Mar. 1, 2019, 6 pages.

Nam et al., “Outage Probability-based Adaptive Guard Band Allocation for Mixed Numerology”, 17th Annual Consumer Communications & Networking Conference (CCNC), 2020, 4 pages.

International Search Report for PCT/KR2022/005435 mailed Jul. 18, 2022, 4 pages.

Written Opinion of the ISA for PCT/KR2022/005435 mailed Jul. 18, 2022, 4 pages.

Notice of Patent Grant dated Jul. 11, 2025 in Korean Patent Application No. 10-2021-0048539 and English-language translation.

Huawei, “Consideration of time alignment error requirement”, R4-115847, 3GPP TSG-RAN WG4 Meeting #61, San Francisco, US, Nov. 14-18, 2011, 3 pages.

Ofice Action dated May 7, 2026 in Chinese Application No. 202280027782.0 and English-language translation.

Office Action dated Apr. 20, 2026 in European Application No. 22 788 478.0.

Ericsson et al., Introduction of operating band XXXII In TS25.141, R4-142677, 3GPP TSG-RAN4 Meeting #71, Seoul, Korea, Feb. 19-23, 2014, 35 pages.

* cited by examiner

APPARATUS AND METHOD FOR PERFORMING COMMUNICATION BASED ON TIMING ALIGNMENT ERROR (TAE) IN WIRELESS COMMUNICATION SYSTEM

CROSS-REFERENCE TO RELATED APPLICATIONS

This application is a continuation of International Application No. PCT/KR2022/005435 designating the United States, filed on Apr. 14, 2022, in the Korean Intellectual Property Receiving Office and claiming priority to Korean Patent Application No. 10-2021-0048539, filed on Apr. 14, 2021, in the Korean Intellectual Property Office, the disclosures of which are incorporated by reference herein in their entireties.

BACKGROUND

Field

The disclosure relates to a wireless communication system, and for example, an apparatus and a method for performing communication based on a timing alignment error (TAE) in the wireless communication system.

Description of Related Art 5G mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR (Augmented Reality), VR (Virtual Reality), MR (Mixed Reality) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

SUMMARY

Embodiments of the disclosure provide a transceiving apparatus and method of a multi-user multi-antenna system in consideration of timing alignment error (TAE) interference.

Embodiments of the disclosure provide an apparatus and a method for minimizing or reducing multi-user interference in a wireless communication system.

Embodiments of the disclosure provide an apparatus and a method for determining a precoder using a TAE.

Embodiments of the disclosure provide an apparatus and a method for determining a receive decoder using a TAE.

Embodiments of the disclosure provide an apparatus and a method for performing communication of a digital unit (DU) and a radio unit (RU) using a TAE.

A method of operating a base station according to various example embodiments of the present disclosure may include: receiving channel information from at least one terminal, obtaining channel interference information, based on the channel information, obtaining a precoder based on the channel interference information, and transmitting a transmit signal to the at least one terminal based on the precoder, the channel interference information may include timing alignment error (TAE) interference and multi-user interference, and the TAE interference may be determined based on a number of first radio access technology (RAT) symbols and a number of second RAT symbols allocated to the transmit signal.

A method of operating a terminal in a wireless communication system according to various example embodiments of the present disclosure may include: transmitting channel information to a base station, receiving a signal from the base station, obtaining a decoder based on channel interference information determined based on the channel information, and decoding the signal based on the decoder, wherein the channel interference information may include timing alignment error (TAE) interference and multi-user interference, and the TAE interference may be determined based on a number of first radio access technology (RAT) symbols and a number of second RAT symbols allocated to the transmit signal.

A method of operating a digital unit (DU) according to various example embodiments of the present disclosure may include: obtaining channel interference information based on channel information, obtaining a precoder based on the channel interference information, and transmitting the precoder to a radio unit (RU), the channel interference information may include timing alignment error (TAE) interference and multi-user interference, the TAE interference may be determined based on a number of first radio access technology (RAT) symbols and a number of second RAT symbols allocated to the transmit signal, and the channel information may be received from at least one terminal.

An apparatus of a base station according to various example embodiments of the present disclosure may include: a transciever, and a processor, the processor may be configured to: receive channel information from at least one terminal via the transceiver, obtain channel interference information based on the channel information, obtain a precoder based on the channel interference information, and control the transceiver to transmit a transmit signal to the at least one terminal based on the precoder, the channel interference information may include timing alignment error (TAE) interference and multi-user interference, and the TAE interference may be determined based on a number of first radio access technology (RAT) symbols and a number of second RAT symbols allocated to the transmit signal.

An apparatus of a terminal according to various example embodiments of the present disclosure may include: a transciever, and a processor, the processor may be configured to: control the transceiver to transmit channel information to a base station, receive a signal from the base station using the transceiver, obtain a decoder based on channel interference information determined based on the channel information, and decode the signal based on the decoder, the channel interference information may include timing alignment error (TAE) interference and multi-user interference, and the TAE interference may be determined based on a number of first radio access technology (RAT) symbols and a number of second RAT symbols allocated to the transmit signal.

An apparatus of a digital unit (DU) according to various example embodiments of the present disclosure may include: a transciever, and a processor, the processor may be configured to: obtain channel interference information based on channel information, obtain a precoder based on the channel interference information, and control the transceiver to transmit the precoder to a radio unit (RU), the channel interference information may include timing alignment error (TAE) interference and multi-user interference, the TAE interference may be determined based on a number of first radio access technology (RAT) symbols and a number of second RAT symbols allocated to the transmit signal, and the channel information may be received from at least one terminal.

An apparatus and a method according to various example embodiments of the present disclosure, enable more stable communication, by considering timing alignment error (TAE) interference occurring in a dynamic spectrum sharing (DSS) environment where a long-term evolution (LTE) communication system and a new radio (NR) communication exist together.

In addition, an apparatus and a method according to various example embodiments of the present disclosure, provide an effect of efficiently controlling interference, by designing a precoder and a decoder of a multi-antenna system using TAE interference.

Effects obtainable from the present disclosure are not limited to the above-mentioned effects, and other effects which are not mentioned may be clearly understood by those skilled in the art of the present disclosure through the following descriptions.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPT ON

Figure 1A:
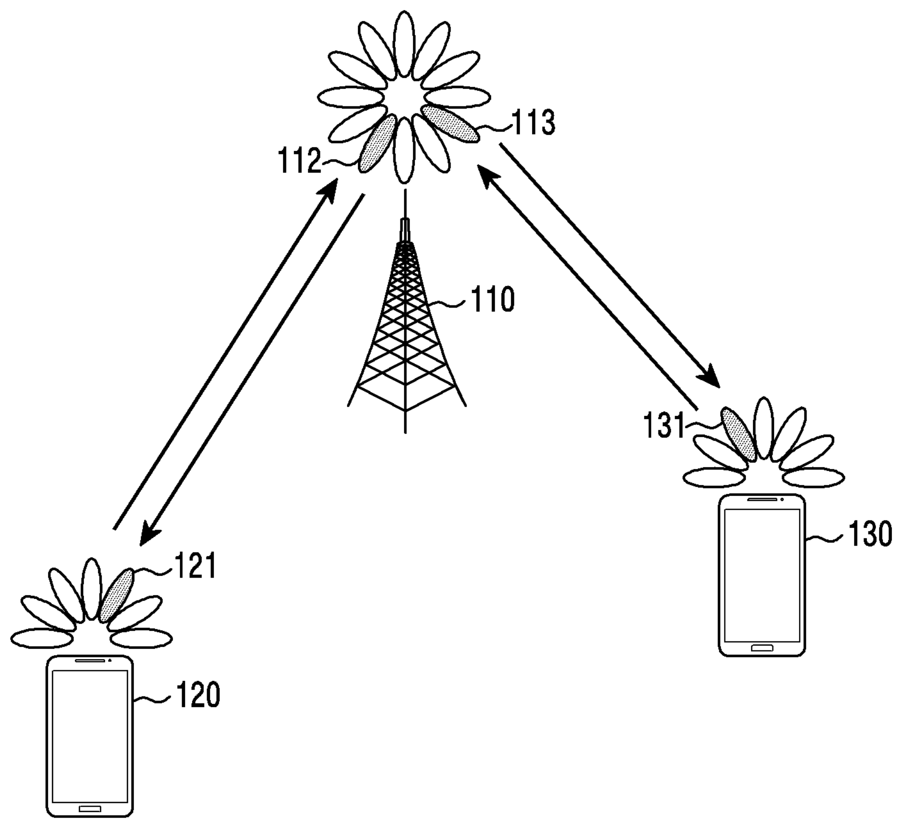
FIG. 1A is a diagram illustrating an example wireless communication system according to various embodiments.

Terms used in the present disclosure are used to describe various particular embodiments, and is not intended to limit the scope of other embodiments or the disclosure. A singular expression may include a plural expression, unless they are definitely different in a context. Terms used herein, including technical and scientific terms, may have the same meaning as those commonly understood by a person skilled in the art of the present disclosure. Terms defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even where a term is defined in the present disclosure, it should not be interpreted to exclude embodiments of the present disclosure.

Various example embodiments of the present disclosure to be described explain a hardware approach by way of example. However, since the various embodiments of the present disclosure include a technology using both hardware and software, various embodiments of the present disclosure do not exclude a software based approach.

In the following description, terms indicating signals (e.g., a message, information, a preamble, a signal, signaling, a sequence, a stream), terms indicating resources (e.g., a symbol, a slot, a subframe, radio a frame, a subcarrier, a resource element (RE), a resource block (RB), a bandwidth part (BWP), occasion), terms indicating operation states (e.g., a step, an operation, a procedure), terms indicating data (e.g., a user stream, an intelligence quotient (IQ) data, information, a bit, a symbol, a codeword), terms indicating channels, terms indicating control information (e.g., downlink control information (DCI), medium access control (MAC) control element (CE), radio resource control (RRC) signaling), terms indicating network entities, terms indicating components of a device, and so on are illustrated for the convenience of description. Accordingly, the present disclosure is not limited to terms to be described, and other terms having equivalent technical meanings may be used.

In the present disclosure, to determine whether a specific condition is satisfied or fulfilled, expressions such as greater than or less than are used by way of example and do not exclude expressions such as greater than or equal to or less than or equal to. A condition described with 'greater than or equal to' may be replaced by 'greater than', a condition described with 'less than or equal to' may be replaced by 'less than', and a condition described with 'greater than or equal to and less than' may be replaced by 'greater than and less than or equal to'.

In addition, the present disclosure describes various embodiments using terms used in some communication standard (e.g., 3rd generation partnership project (3GPP), extensible radio access network (xRAN), open-radio access network (O-RAN)), which are merely examples used for ease of explanation. Various embodiments of the present disclosure may be easily modified and applied in other communication system.

FIG. 1A is a diagram illustrating an example wireless communication system according to various embodiments. FIG. 1A illustrates a base station 110, a terminal 120, and a terminal 130, as some of nodes using radio channels in the wireless communication system. Although FIG. 1A illustrates only one base station, other base stations which are the same as or similar to the base station 110 may further be included.

The base station 110 is a network infrastructure which provides radio access to the terminals 120 and 130. The base station 110 has coverage defined as a specific geographic region based on a signal transmission distance. The base station 110 may be referred to as, beside the base station, an 'access point (AP)', an 'eNodeB (eNB)', a '5th generation node (5G node)', a 'next generation nodeB (gNB)', a 'wireless point', a 'transmission/reception point (TRP)', or other term having technically identical meaning.

The terminal 120 and the terminal 130 each are a device is used by a user, and communicate with the base station 110 over the radio channel. A link from the base station 110 toward the terminal 120 or the terminal 130 is referred to as a downlink (DL), and a link from the terminal 120 or the terminal 130 toward the base station 110 is referred to as an uplink (UL). In addition, the terminal 120 and the terminal 130 may perform communication between them over the radio channel. In so doing, a device-to-device (D2D) link between the terminal 120 and the terminal 130 is referred to as a sidelink, and the sidelink may be interchangeably used with a PC5 interface. In some cases, at least one of the terminal 120 and the terminal 130 may be operated without user's involvement. For example, at least one of the terminal 120 and the terminal 130 may be a device which performs machine type communication (MTC), and may not be carried by the user. The terminal 120 and the terminal 130 each may be referred to, for example, as, beside the terminal, a 'user equipment (UE)', a 'customer premises equipment (CPE)', a 'mobile station', a 'subscriber station', a 'remote terminal', a 'wireless terminal', an 'electronic device', or a 'user device', or other term having technically identical meaning.

The base station 110, the terminal 120, and the terminal 130 may perform beamforming. The base station 110, the terminal 120, and the terminal 130 may transmit and receive a radio signal in not only a relatively low frequency band (e.g., a frequency range 1 (FR1) of NR) but also a high frequency band (e.g., an FR2 of NR, a millimeter wave (mmWave) band (e.g., 28 GHz, 30 GHz, 38 GHz, and 60 GHz)). In this case, to improve a channel gain, the base station 110, the terminal 120, and the terminal 130 may perform the beamforming. Herein, the beamforming may include transmit beamforming and receive beamforming. That is, the base station 110, the terminal 120, and the terminal 130 may give directivity to a transmit signal or a receive signal. For doing so, the base station 110 and the terminals 120 and 130 may select serving beams 112, 113, 121, and 131 through a beam search or beam management procedure. After the serving beams 112, 113, 121, and 131 are selected, communication may be performed through resources which are quasi co-located (QCL) with resources transmitting the serving beams 112, 113, 121, and 131. The base station/terminal according to various embodiments of the present disclosure may perform the communication even within a frequency range corresponding to the FR1. The base station/terminal may or may not perform the beamforming.

If large-scale characteristics of a channel carrying a symbol on a first antenna port may be inferred from a channel carrying a symbol on a second antenna port, the first antenna port and the second antenna port may be estimated to be QCL. For example, the large-scale characteristics may include at least one of delay spread, doppler spread, doppler shift, average gain, average delay, and spatial receiver parameter.

In the present disclosure, a beam may refer, for example, to a spatial flow of a signal in the radio channel, and may be formed by one or more antennas (or antenna elements), and this forming procedure may be referred to as the beamforming. The beamforming may include analog beamforming and digital beamforming (e.g., precoding). A reference signal transmitted based on the beamforming may include, for example, a demodulation-reference signal (DM-RS), a channel state information-reference signal (CSI-RS), a synchronization signal/physical broadcast channel (SS/PBCH), and a sounding reference signal (SRS). In addition, as a configuration for each reference signal, an information element (IE) such as a CSI-RS resource or an SRS-resource may be used, and this configuration may include information associated with the beam. The information associated with the beam may indicate whether the corresponding configuration (e.g., CSI-RS resource) uses the same spatial domain filter as other configuration (e.g., another CSI-RS resource in the same CSI-RS resource set) or uses a different spatial domain filter, or which reference signal is QCL, and a type (e.g., QCL type A, B, C, D) if it is QCL.

If storing a beam profile during an RU initialization procedure, the base station may store a common beam vector and each precoding vector in order of each layer. Considering each of all terminals (e.g., users) as one layer and applying a common weight vector (precoder) to each terminal may be understood as forming a common beam applied to all of the terminals. In addition, applying a specific precoder for a multi-layer to each terminal may be understood as single-user beamforming for each terminal. Meanwhile, even if the precoder is applied to the terminals, signals transmitted to some terminals may be spatially distinguished from signals transmitted to other some terminals. In this case, applying the corresponding precoder may be understood as multi-user beamforming.

Conventionally, in a communication system having a relatively great cell radius of a base station, each base station is installed such that each base station includes functions of a digital processing unit (or a DU) and a radio frequency (RF) processing unit (or a RU). However, as a high frequency band is used in the communication system of 4th generation (4G) and/or a next communication system and the cell radius of the base station decreases, the number of base stations for covering a specific region has increased, and installation cost burden of an operator for installing the increased base stations has increased. To minimize and/or reduce the installation cost of the base station, a structure in which the DU and the RU of the base station are separated, one or more RUs are connected to one DU via a wired network, and one or more RUs distributed geographically are deployed to cover the specific region has been suggested. Hereafter, a deployment structure and extension examples of the base station according to various embodiments will be described in greater detail below with reference to FIG. 1B.

Figure 1B:
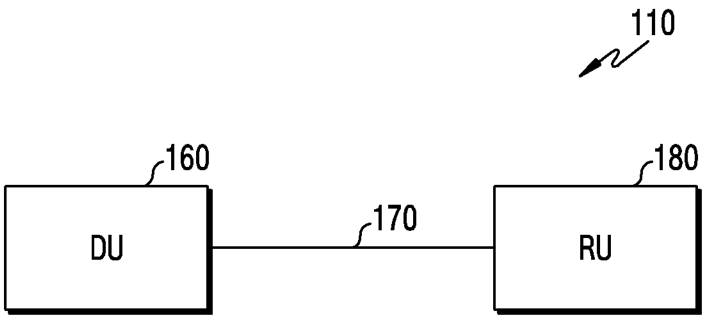
FIG. 1B is a block diagram illustrating an example of a fronthaul structure according to functional split of a base station according to various embodiments.

FIG. 1B is a block diagram illustrating an example configuration of a fronthaul structure according to a function split of a base station according to various embodiments. Unlike a backhaul between a base station and a core network, the fronthaul may refer, for example, to entities between a wireless local area network (WLAN) and the base station.

Referring to FIG. 1B, the base station 110 may include a DU 160 and an RU 180. A fronthaul 170 between the DU 160 and the RU 180 may be operated via an $F_x$ interface. For the operation of the fronthaul 170, for example, an interface such as an enhanced common public radio interface (eCPRI) and radio over Ethernet (ROE) may be used.

Mobile data traffic increases with development of communication technology, and accordingly bandwidth requirements required in the fronthaul between the DU and the RU has greatly increased. In deployment such as a centralized/cloud radio access network (C-RAN), the DU may be implemented to perform functions of a packet data convergence protocol (PDCP), a radio link control (RLC), a MAC, and a physical (PHY) layer, and the RU may be implemented to further perform functions of the PHY layer in addition to the RF function.

The DU 160 may manage an upper layer function of the radio network. For example, the DU 160 may perform a function of the MAC layer, and part of the PHY layer. The part of the PHY layer is performed at a higher stage among the functions of the PHY layer, and may include, for example, channel encoding (or channel decoding), scrambling (or descrambling), modulation (or demodulation), and layer mapping (or layer demapping). According to an embodiment, if the DU 160 conforms to the O-RAN standard, it may be referred to as an O-RAN DU (O-DU). The DU 160 may be replaced with and expressed as a first network entity for the base station (e.g., a gNB) in embodiments of the present disclosure as needed.

The RU 180 may manage a lower layer function of the radio network. For example, the RU 180 may perform a part of the PHY layer, and the RF function. The part of the PHY layer is performed at a relatively lower stage than the DU 160 among the functions of the PHY layer, and may include, for example, inverse fast Fourier transform (FFT) (IFFT) transformation (or FFT transformation), cyclic prefix (CP) insertion (CP removal), and digital beamforming. An example of a specific function split shall be described in detail in FIG. 4. The RU 180 may be referred to as an 'access unit (AU)', an 'AP', a 'TRP', a 'remote radio head (RRH)', an 'RU' or other term having the technically equivalent meaning. According to an embodiment, if the RU 180 conforms to the O-RAN standard, it may be referred to as an O-RAN RU (O-RU). The RU 180 may be replaced with and expressed as a second network entity for the base station (e.g., az gNB) in embodiments of the present disclosure as needed.

FIG. 1B illustrates that the base station includes the DU and the RU, but various embodiments of the present disclosure are not limited thereto. In some embodiments, the base station may be implemented with distributed deployment according to a distributed unit (DU) configured to perform functions of a centralized unit (CU) and a lower layer configured to perform functions of upper layers (e.g., PDCP and RRC) of an access network. At this time, the DU may include the DU and the RU of FIG. 1. Between the core (e.g., a 5G core (5GC) or a next generation core (NGC)) network and the RAN, the base station may be implemented in a structure deployed in order of the CU, the DU, and the RU. An interface between the CU and the DU may be referred to as an F1 interface.

The CU may be connected to one or more DUs, to manage the functions of the layer higher than the DU. For example, the CU may manage the functions of the RRC and PDCP layers, and the DU and the RU may manage functions of the lower layer. The DU may perform the RLC, the MAC, and some functions (high PHY) of the PHY layer, and the RU may manage the other functions (low PHY) of the PHY layer. In addition, for example, the DU may be included in the DU, according to the distributed deployment implementation of the base station. Hereafter, unless otherwise defined, descriptions are provided with the operations of the DU and the RU, but various embodiments of the preset disclosure may be applied to both base station deployment including the CU or deployment in which the DU is directly connected to the core network without the CU (e.g., the CU and the DU are integrated and implemented as one entity).

Figure 2:
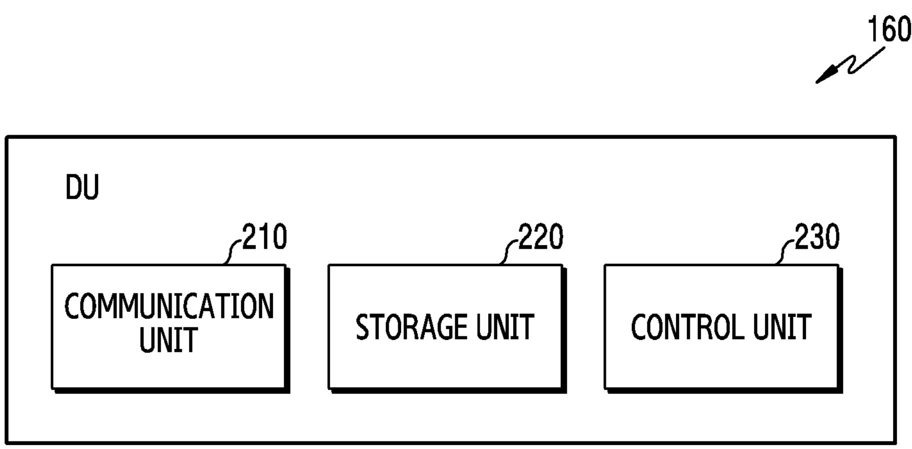
FIG. 2 is a block diagram illustrating an example configuration of a digital unit (DU) in a wireless communication system according to various embodiments.

FIG. 2 is a block diagram illustrating an example configuration of a DU in the wireless communication system according to various embodiments. The configuration illustrated in FIG. 2 may be understood as the configuration of the DU 160 of FIG. 1B as part of the base station. A term such as '~ unit' or '~ er' used hereafter indicates a unit for processing at least one function or operation, and may be implemented using hardware, software, or a combination of hardware and software.

Referring to FIG. 2, the DU 160 includes a communication unit (e.g., including communication circuitry) 210, a storage unit (e.g., including a memory) 220, and a control unit (e.g., including processing and/or control circuitry) 230.

The communication unit 210 may include various communication circuitry and perform functions for transmitting or receiving a signal, in a wired communication environment. The communication unit 210 may include a wired interface, for controlling a direct connection between a device and a device through a transmission medium (e.g., copper wire and optical fiber). For example, the communication unit 210 may transfer an electrical signal to other device through a copper wire, or may perform conversion between an electrical signal and an optical signal. The communication unit 210 may be connected to the RU. The communication unit 210 may be connected to the core network or may be connected to the CU of the distributed deployment.

The communication unit 210 may perform functions for transmitting or receiving a signal in the wired communication environment. For example, the communication unit 210 may perform conversion between a baseband signal and a bit stream according to the physical layer specification of the system. For example, in data transmission, the communication unit 210 generates complex symbols by encoding and modulating a transmit bit stream. In data reception, the communication unit 210 restores a received bit stream by demodulating and decoding the baseband signal. The communication unit 210 may include a plurality of transmit/receive paths. In addition, according to an embodiment, the communication unit 210 may be connected to the core network or may be connected to other nodes (e.g., integrated access backhaul (IAB)).

The communication unit 210 may transmit and/or receive a signal. For doing so, the communication unit 210 may include at least one transceiver. For example, the communication unit 210 may transmit a synchronization signal, a reference signal, system information, a message, a control message, a stream, control information, data, or the like. The communication unit 210 may perform the beamforming.

The communication unit 210 transmits and/or receives the signal as described above. Hence, all or a part of the communication unit 210 may be referred to as a 'transmitter', a 'receiver', or a 'transceiver'. In the following description, transmission and reception performed via a radio channel may include processing performed by the communication unit 210 as mentioned above.

Although not depicted in FIG. 2, the communication unit 210 may further include a backhaul communication unit for connecting to the core network or another base station. The backhaul communication unit provides an interface to communicating with other nodes within the network. For example, the backhaul communication unit converts into a physical signal, a bit stream transmitted from the base station to other node, for example, other access node, another base station, an upper node, the core network, and so on, and converts a physical signal received from other node into a bit stream.

The storage unit 220 stores data such as a basic program, an application program, and configuration information for operations of the DU 160. The storage unit 220 may include a memory. The storage unit 220 may include a volatile memory, a nonvolatile memory, or a combination of a volatile memory and a nonvolatile memory. The storage unit 220 provides the stored data at a request of the control unit 230. According to an embodiment, the storage unit 220 may store scheduling information (e.g., beam information, antenna port information), and flow information (e.g., eAxC) for each stream.

The control unit 230 may include various processing and/or control circuitry and control general operations of the DU 160. For example, the control unit 230 transmits and receives the signal via the communication unit 210 (or the backhaul communication unit). In addition, the control unit 230 records and reads data in the storage unit 220. The control unit 230 may perform functions of a protocol stack required by the communication standard. For doing so, the control unit 230 may include at least one processor. In some embodiments, the control unit 230 may include a control message generator including resource allocation information for scheduling multiple layers, and a flow identifier for transmitting a corresponding control message. The control message generator and the flow identifier are instruction sets or codes stored in the storage unit 230, and may be instructions/codes at least temporarily residing in the control unit 230 or a storage space storing instructions/codes, or may be a part of circuitry of the control unit 230. According to various embodiments, the control unit 230 may control the DU 160 to perform operations according to the various embodiments described below.

The configuration of the DU 160 shown in FIG. 2 is merely an example, and the example of the DU performing various embodiments of the present disclosure is not limited from the configuration shown in FIG. 2. For example, some configuration may be added, deleted, or changed, according to various embodiments.

Figure 3:
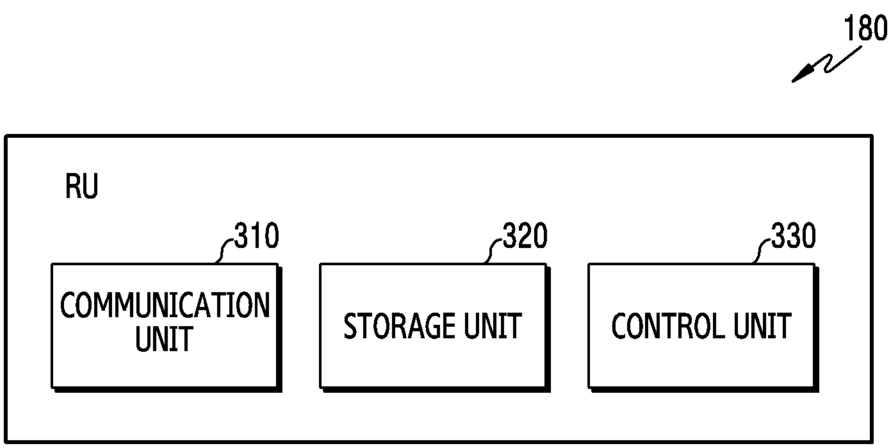
FIG. 3 is a block diagram illustrating an example configuration of a radio unit (RU) in a wireless communication system according to various embodiments.

FIG. 3 is a block diagram illustrating an example configuration of an RU in the wireless communication system according to various embodiments. The configuration illustrated in FIG. 3 may be understood as the configuration of the RU 180 of FIG. 1B as part of the base station. A term such as '~ unit' or '~ er' used hereafter indicates a unit for processing at least one function or operation, and may be implemented using hardware, software, or a combination of hardware and software.

Referring to FIG. 3, the RU 180 includes a communication unit (e.g., including communication circuitry) 310, a storage unit (e.g., including a memory) 320, and a control unit (e.g., including processing and/or control circuitry) 330.

The communication unit 310 may include various communication circuitry and performs functions for transmitting or receiving a signal over a radio channel. For example, the communication unit 310 up-converts a baseband signal into an RF band signal, transmits it via an antenna, and down-converts an RF band signal received via the antenna into a baseband signal. For example, the communication unit 310 may include a transmit filter, a receive filter, an amplifier, a mixer, an oscillator, a digital to analog convertor (DAC), an analog to digital convertor (ADC), and the like.

The communication unit 310 may include a plurality of transmit/receive paths. Further, the communication unit 310 may include an antenna unit. The communication unit 310 may include at least one antenna array including a plurality of antenna elements. In terms of hardware, the communication unit 310 may include a digital circuit and an analog circuit (e.g., a radio frequency integrated circuit (RFIC)). Herein, the digital circuit and the analog circuit may be implemented in a single package. In addition, the communication unit 310 may include a plurality of RF chains. The communication unit 310 may perform the beamforming. To give directivity to a signal to transmit or receive according to the configuration of the control unit 330, the communication unit 310 may apply a beamforming weight to the signal. According to an embodiment, the communication unit 310 may include an RF block (or an RF unit).

In addition, the communication unit 310 may transmit and/or receive a signal. For doing so, the communication unit 310 may include at least one transceiver. The communication unit 310 may transmit a downlink signal. The downlink signal may include a synchronization signal (SS), an RS (e.g., a cell-specific reference signal (CRS) and a DM-RS), system information (e.g., MIB, SIB, remaining system information (RMSI), other system information (OSI)), a configuration message, control information, downlink data or the like. The communication unit 310 may receive an uplink signal. The uplink signal may include a random access related signal (e.g., a random access preamble (RAP) (or a message 1 (Msg1) and a message 3 (Msg3)) or a reference signal (e.g., a SRS, and a DM-RS), a power headroom report (PHR), or the like.

The communication unit 310 transmits and/or receives the signal as described above. Hence, all or a part of the communication unit 310 may be referred to as a 'transmitter', a 'receiver', or a 'transceiver'. In addition, transmission and reception conducted over the radio wireless channel in the following description may include processing performed by the communication unit 310 as mentioned above.

The storage unit 320 may include a memory and stores data such as a basic program, an application program, and configuration information for the operations of the RU 180. The storage unit 320 may include a volatile memory, a nonvolatile memory, or a combination of a volatile memory and a nonvolatile memory. The storage unit 320 provides the stored data at a request of the control unit 330.

The control unit 330 may include various processing and/or control circuitry and controls general operations of the RU 180. For example, the control unit 330 transmits and receives a signal via the communication unit 310. The control unit 330 records and reads data in the storage unit 320. The control unit 330 may perform functions of the protocol stack required by the communication standard. For doing so, the control unit 330 may include at least one processor. The control unit 330 may include various modules for performing the communication. According to various embodiments, the control unit 330 may control the terminal to perform operations according to various embodiments to be described.

Figure 4:
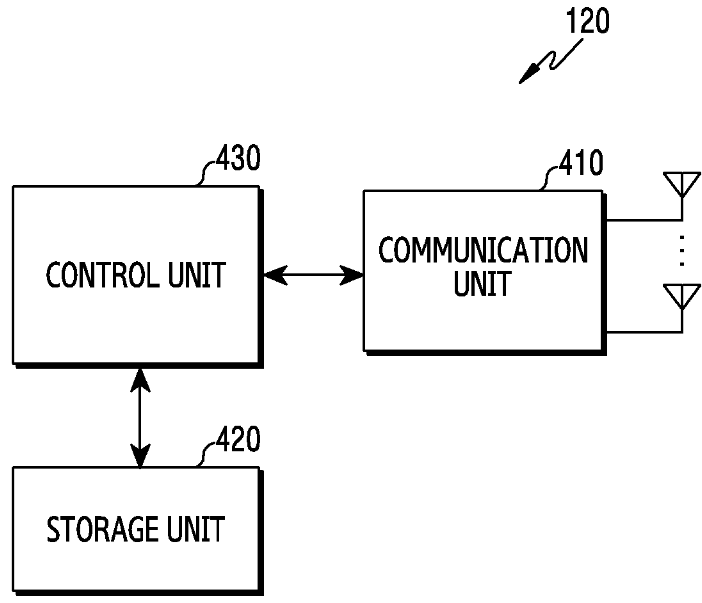
FIG. 4 is a block diagram illustrating an example configuration of a device for performing communication in a wireless communication system according to various embodiments.

FIG. 4 is a block diagram illustrating an example configuration of a device for performing communication in a wireless communication system according to various embodiments. The configuration illustrated in FIG. 4 may be understood as the configuration of the receiving stage 120. A term such as '~ unit' or '~ er' used hereafter indicates a unit for processing at least one function or operation, and may be implemented using hardware, software, or a combination of hardware and software. Referring to FIG. 4, the device may include a communication unit (e.g., including communication circuitry) 410, a storage unit (e.g., including a memory) 420, and a control unit (e.g., including processing and/or control circuitry) 430.

The communication unit 410 may include various communication circuitry and performs functions for transmitting and/or receiving a signal over a radio channel. For example, the communication unit 410 may perform a conversion function between a baseband signal and a bit stream according to the physical layer specification of the system. For example, in data transmission, the communication unit 410 generates complex symbols by encoding and modulating a transmit bit stream. In data reception, the communication unit 410 restores a received bit stream by demodulating and decoding a baseband signal. Also, the communication unit 410 may up-convert a baseband signal into an RF band signal, transmit it via an antenna, and down-convert an RF band signal received via the antenna into a baseband signal.

For doing so, the communication unit 410 may include a transmit filter, a receive filter, an amplifier, a mixer, an oscillator, a DAC, an ADC, and the like. The communication unit 410 may include a plurality of transmit and receive paths. Further, the communication unit 310 may include at least one antenna array including a plurality of antenna elements. In terms of hardware, the communication unit 310 may include a digital unit and an analog unit, and the analog unit may include a plurality of sub-units according to an operating power, an operating frequency, and so on. In addition, the communication unit 410 may include a decoder for performing decoding according to various embodiments of the present disclosure.

The communication unit 410 transmits and/or receives the signal as described above. Hence, all or a part of the communication unit 410 may be referred to as a 'transmitter', a 'receiver', or a 'transceiver'. In addition, in the following description, the transmission and the reception conducted over the radio wireless channel are used as meaning including processing performed by the communication unit 410 as mentioned above. In addition, if the device of FIG. 4 is a base station, the communication unit 410 may further include a backhaul communication unit for communicating with other network entity connected via a backhaul network.

The storage unit 420 may include a memory and stores data such as a basic program, an application program, and configuration information for the operations of the receiving stage 120. The storage unit 420 may include a volatile memory, a nonvolatile memory, or a combination of a volatile memory and a nonvolatile memory. The storage unit 420 provides the stored data at a request of the control unit 430.

The control unit 430 may include various processing and/or control circuitry and controls general operations of the device. For example, the control unit 430 transmits and receives a signal via the communication unit 420. In addition, the control unit 430 records and reads data in the storage unit 430. For doing so, the control unit 430 may include at least one processor or a micro processor, or may be a part of the processor. According to various embodiments, the control unit 430 may control the device to perform operations according to various embodiments to be described.

Dynamic spectrum sharing (DSS) may refer, for example, to a technology for deploying both of the 4G LTE and the 5G NR in the same frequency band. The base station may dynamically allocate spectrum resources as demanded by the user using the DSS. For example, without the DSS, an operator having an intermediate band spectrum of 20 MHz may need to split the corresponding spectrum into two. In other words, the operator needs to allocate 10 MHz spectrum to 4 MHz LTE, and include every LTE user in 10 MHz spectrum. Hence, the 5G may use the remaining 10 MHz advanced wireless services (AWS) spectrum. Using the DSS, the operator does not need to split the intermediate band spectrum, or to have the 4G LTE or 5G only spectrum.

A wireless communication system including a plurality of radio access technologies (RATs) requires time synchronization between different RATs. The plurality of the RATs may include the LTE-based wireless communication system, and the NR-based wireless communication system. In addition, in MIMO communication, time synchronization is required between a plurality of antennas. If the time is not synchronized between different RATs or the time is not synchronized between the plurality of the antennas, it may be difficult to transmit and receive an accurate signal in communication between base stations or between a base station and a terminal. For example, a precoder of a transmitting device or a decoder of a receiving device may not efficiently operate. Thus, it may be necessary to accurately acquire the time synchronization, to achieve the accurate precoder and decoder. The wireless communication system including the plurality of the RATs may be subject to interference due to timing alignment error (TAE). Hence, a precoder and a decoder acquired by reflecting the interference due to the TAE are required.

The TAE may refer, for example, to a timing alignment error which may occur between different signals. For example, it may indicate a timing alignment error which may occur between signals transmitted from different antennas. For example, it may indicate a timing alignment error which may occur between signals transmitted using different RATs. For example, it may indicate a timing alignment error which may occur between signals according to a transmitter configuration and a transmission mode. For example, the TAE may be defined as the greatest timing difference between two signals belonging to different antennas, with respect to a specific signal set, the transmitter configuration, and the transmission mode. For example, the TAE may be referred to as the greatest timing difference between two signals belonging to different transmitter groups in a transceiver array boundary.

Figure 5:
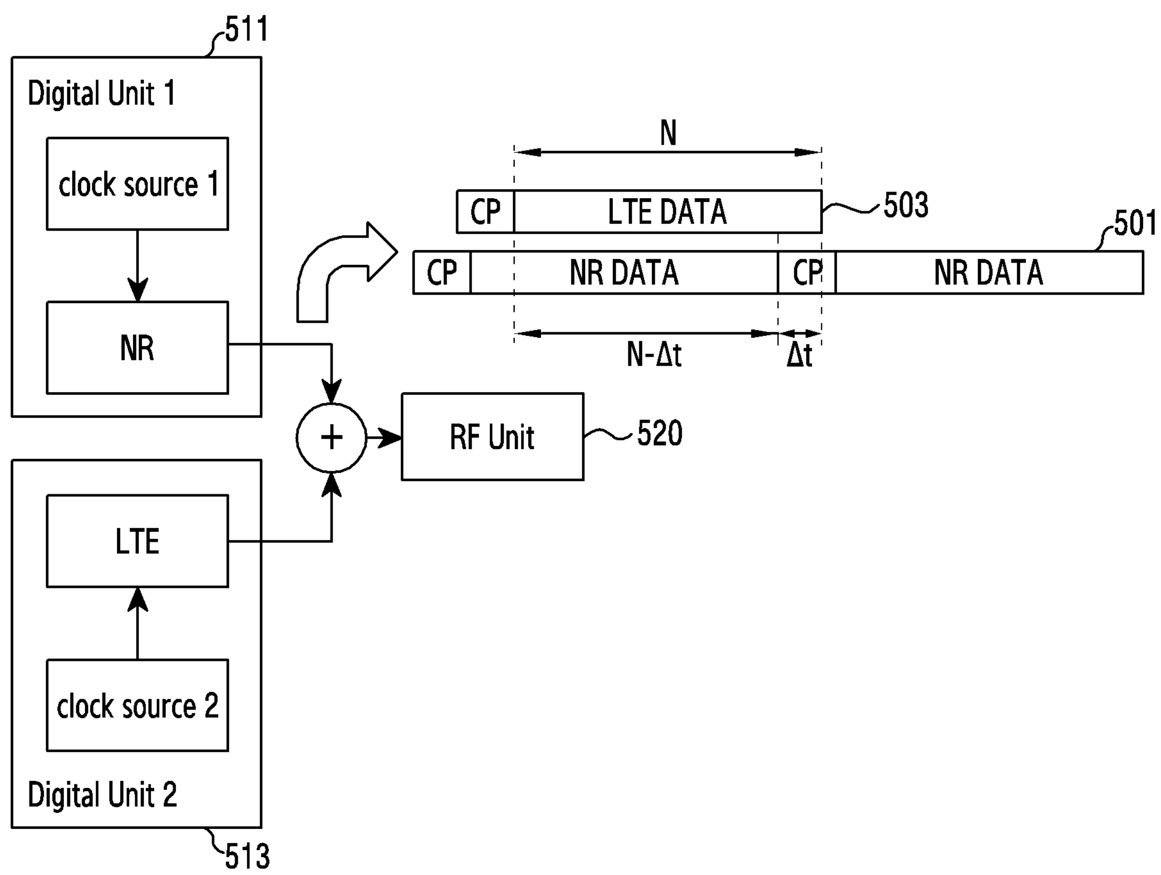
FIG. 5 is a diagram illustrating an example of a timing alignment error (TAE) in new radio (NR)-long-term evolution (LTE) dynamic spectrum sharing (DSS) according to various embodiments.

FIG. 5 is a diagram illustrating an example of a TAE in NR-LTE DSS according to various embodiments.

In a wireless communication system, if a communication operator is already servicing an LTE base station, the communication operator may refarm the LTE base station as an NR base station. The refarming may generally indicate a process for changing a spectrum band to a more efficient technology and/or a new service. As the NR system is adopted, necessity for the NR base station device is increasing. In this case, it may be efficient to perform the NR-LTE DSS by adding the NR base station system to the existing LTE base station system, rather than newly applying a new LTE+NR base station.

The NR base station may transmit a signal via two or more antennas (e.g., transmitter diversity and MIMO). For example, if different frequency bands are used (e.g., carrier aggregation (CA)) as in the DSS, each carrier may be transmitted from a different antenna of the base station. Timings at which the signals transmitted via the different antennas are received at the terminal may be different from each other. For the terminal to receive and decode the signals transmitted from the different antennas, a signal frame of each signal needs to be aligned according to a defined range. A signal frame timing relation between the different antennas of the base station may be related to the TAE. An allowed maximum error may differ according to the function or the function combination (e.g., transmit diversity, MIMO, CA, etc.) of the base station antenna.

In addition, the TAE may occur if the NR-LTE DSS is performed by adding the NR base station to the existing LTE base station. Referring to FIG. 5, in the NR-LTE DSS, an occurrence aspect of TAE $\Delta t$ which may occur because clock sources are different between the existing LTE base station system and the NR base station system is shown.

In the wireless communication system where the NR and the LTE coexist, two DUs using different RATs may be connected to one radio frequency unit to operate. As shown in FIG. 5, a DU 511 using an NR clock source and a DU 513 using an LTE clock source may be connected to an RU 520. Since a signal 503 transmitted from the DU 513 and a signal 501 transmitted from the DU 511 are different in the clock source, time may not be synchronized as shown in FIG. 5. That is, since one RU processes the signals transmitted from the DUs based on the different RATs, the TAE may occur like $N-\Delta t$ or $\Delta t$. As the TAE occurs, interference may occur between the signal 501 transmitted from the DU 511 and the signal 503 transmitted from the DU 513. Hence, to address this problem, what is needed is a solution for accurately obtaining the TAE between the DUs based on the different RATs, and thus communicating.

In the following description, the occurrence aspect of the TAE interference which may occur if the TAE exists between NR-LTE in DSS system implementation. In addition, various embodiments of the present disclosure suggest beamforming precoder and decoder structures for efficient communication if TAE interference exists and their interface. Hereafter, it is described by way of example that LTE interferes with an NR symbol in the explanation, which is merely an example, and accordingly the scope of the present disclosure is not limited thereto. The scope according to the present disclosure may include TAE interference between different NR symbols having different numerologies and interference of the NR symbol with the LTE symbol.

Figure 6:
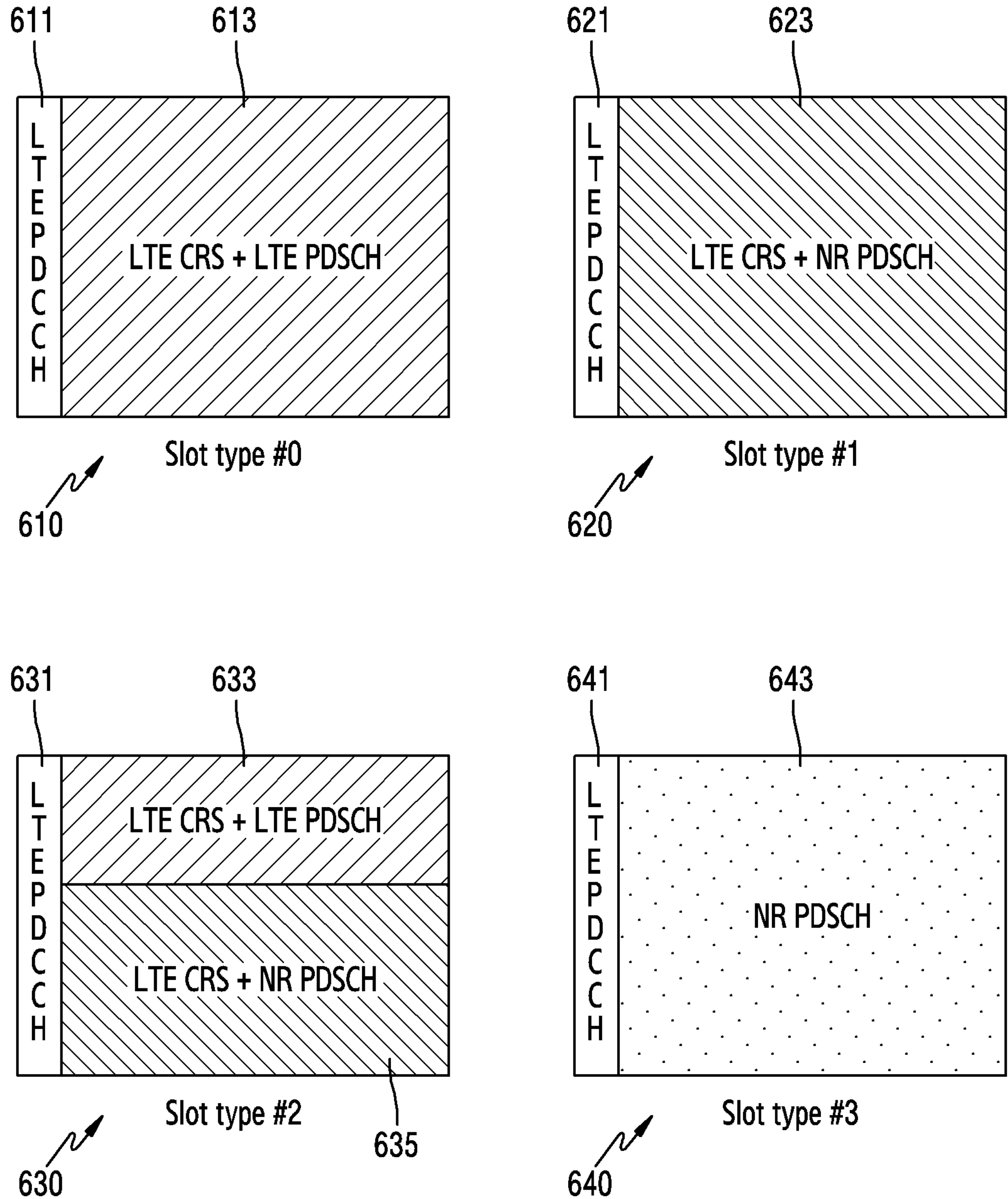
FIG. 6 is a diagram illustrating examples of slot types in an LTE-NR DSS environment according to various embodiments.

FIG. 6 is a diagram illustrating examples of slot types which may be considered in performing NR-LTE DSS according to various embodiments. Referring to FIG. 6, four examples of the slot types which may be considered in performing the NR-LTE DSS are shown. A y axis may indicate a frequency axis, and an x axis may indicate a time axis. Each slot may include a control signal portion and a data signal portion. Hereafter, control information may indicate a signal delivered over a physical layer control channel (e.g., a physical downlink control channel (PDCCH)), and data may indicate a signal delivered over a physical layer data channel (e.g., a physical downlink shared channel (PDSCH)) in FIG. 6. Hereafter, the slot types described are merely examples, and accordingly the scope of the present disclosure is not limited thereto. Other effects which are not mentioned may be clearly understood by those skilled in the art of the present disclosure from the following descriptions. For example, although not depicted in the drawings, the slot type may include only the control information, and may include only the data.

A slot type #0 610 includes control information and data conforming to the LTE system in the slot. The slot type #0 610 may include LTE control information 611 (e.g., PDCCH), and LTE data 613 (e.g., LTE CRS and LTE PDSCH). The slot type #0 610 has the control information and the data related to the LTE system in the slot, and accordingly there may be no effect of the interference due to the TAE resulting from different clock sources between the LTE and the NR.

In slot types #1~3, signals related to the LTE and the NR are all present in the slot. A slot type #1 610 may include LTE control information 621 (e.g., LTE PDCCH) and LTE NR data 623 (e.g., LTE CRS, NR PDSCH) in the slot. A slot type #2 630 may include LTE control information 621 (e.g., LTE PDCCH), LTE data 633 (e.g., LTE CRS, LTE PDSCH) and LTE-NR data 635 (e.g., LTE CRS, NR PDSCH) in the slot. A slot type #3 640 may include LTE control information 641 (e.g., LTE PDCCH) and NR data 643 (e.g., NR PDSCH).

Since the LTE and the NR coexist in the slot in the slot type #1 620, the slot type #2 630, and the slot type #3 640, the TAE may occur due to the different clock sources of the LTE base station and the NR base station. In this case, the interference due to the TAE may occur because subcarrier orthogonality between the LTE and the NR is broken.

Figure 7:
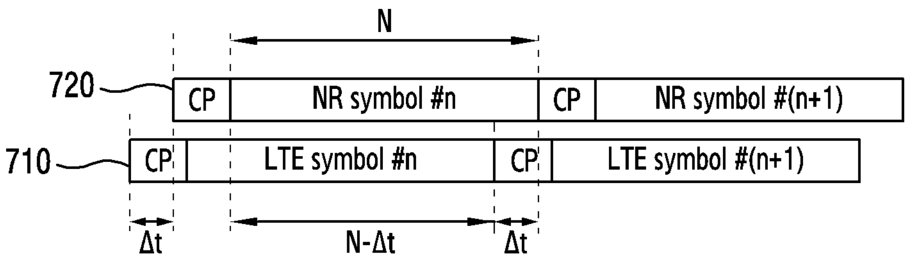
FIG. 7 is a diagram illustrating an example of interference due to a TAE according to various embodiments.

FIG. 7 is a diagram illustrating an example of interference which may occur in LTE-NR DSS according to various embodiments. A signal illustrated in FIG. 7 may be configured through any one of the slot type #1 620, the slot type #2 630, and the slot type #3 640 shown in FIG. 6. In the following description, the LTE symbol interferes with the NR symbol by way of example, which is merely an example. The scope of the present disclosure is not limited thereto, and may be applied to TAE interference between NR symbols having different numerologies, and interference of the NR symbol with the NR symbol.

Referring to FIG. 7, an interference aspect which may occur if an LTE signal timing advances an NR signal timing is shown. If the DSS between LTE-NR is performed, a signal transmitted from the base station may include an LTE signal portion 710 and an NR signal portion 720. Referring to FIG. 7, it may be identified that a frame timing of the LTE signal 710 advances a frame timing 720 of the NR signal. In this case, possible interference may include inter-carrier interference (ICI) (e.g., N−Δt) occurring between n-th symbols and inter-symbol interference (ISI) (e.g., Δt) in which an (n−1)-th symbol affects the n-th symbol.

As described above, the TAE interference of the LTE signal with the NR signal may be expressed as the following equation.

< Equation 1 >

$$I(u,k)=\frac{1}{N^2}\left(\left|\sum_{n=0}^{N-\Delta t-1}e^{-j\frac{2\pi}{N}\Delta fn}\right|^2+\left|\sum_{n=0}^{\Delta t-1}e^{-j\frac{2\pi}{N}\Delta fn}\right|^2\right)=$$

-continued $$\frac{1}{N^2}\left(\left|\frac{\sin\left(\frac{\pi(N-\Delta t)\Delta f}{N}\right)}{\sin\left(\frac{\pi\Delta f}{N}\right)}\right|^2+\left|\frac{\sin\left(\frac{\pi\Delta t\Delta f}{N}\right)}{\sin\left(\frac{\pi\Delta f}{N}\right)}\right|^2\right)$$

In Equation 1, I(u, k) denotes interference occurring between a k-th subcarrier of the LTE symbol and a u-th subcarrier of the NR symbol. Δf denotes a tone spacing (Hz) between the u-th subcarrier and the k-th subcarrier, and N denotes a fast Fourier transform (FFT) size. At this time, the interference I(u) on the u-th subcarrier of the NR by all the subcarriers of the LTE band may be expressed as the following equation.

$$I(u)=\sum\nolimits_{k\in S^L}I(u,k)$$ < Equation 2 >

In Equation 2, $S^L$ denotes a set of subcarriers allocated with data in the LTE band. Hence, average interference $I_{nr}$ allocated in the NR band by the TAE may be calculated based on the following equation.

$$I_{nr}=\frac{1}{\mathrm{card}\,(S^N)}\sum\nolimits_{u\in S^N}I(u)$$ < Equation 3 >

In Equation 3, $S^N$ denotes a set of subcarriers allocated with data in the NR band, and card(S) denotes a size of the set S.

Referring to Equation 3 for calculating the interference $I_{nr}$, it may be obtained that an average power of subcarrier powers allocated in the LTE symbol interferes with the NR band. Based on this, $I_{nr}$ may be approximated based on the following equation.

$$\approx I_{nr}\approx\frac{\Delta t}{N}\times\frac{1}{\mathrm{card}\,(S^N_{sym})}\sum\nolimits_{n\in S^N_{sym}}\left(P^L_{ICI,n}+P^L_{ISI,n}\right)=\frac{\Delta t}{N}\times\frac{\#\text{ of allocated }LTE\ REs\times EPRE}{\#\text{ of allocated }NR\ REs}$$ < Equation 4 >

In Equation 4, $$P^L_{ICI,n}$$

denotes a symbol power generating the ICI in the n-th NR symbol, $$P^L_{ISI,n}$$

denotes a symbol power generating the ISI in the n-th NR symbol, $$\mathrm{card}(S^N_{sym})$$

denotes the number of the NR symbols, N denotes the FFT size, and # of allocated LTE REs×EPRE denotes a product of the number of LTE REs and an energy per resource element (EPRE).

Figure 8:
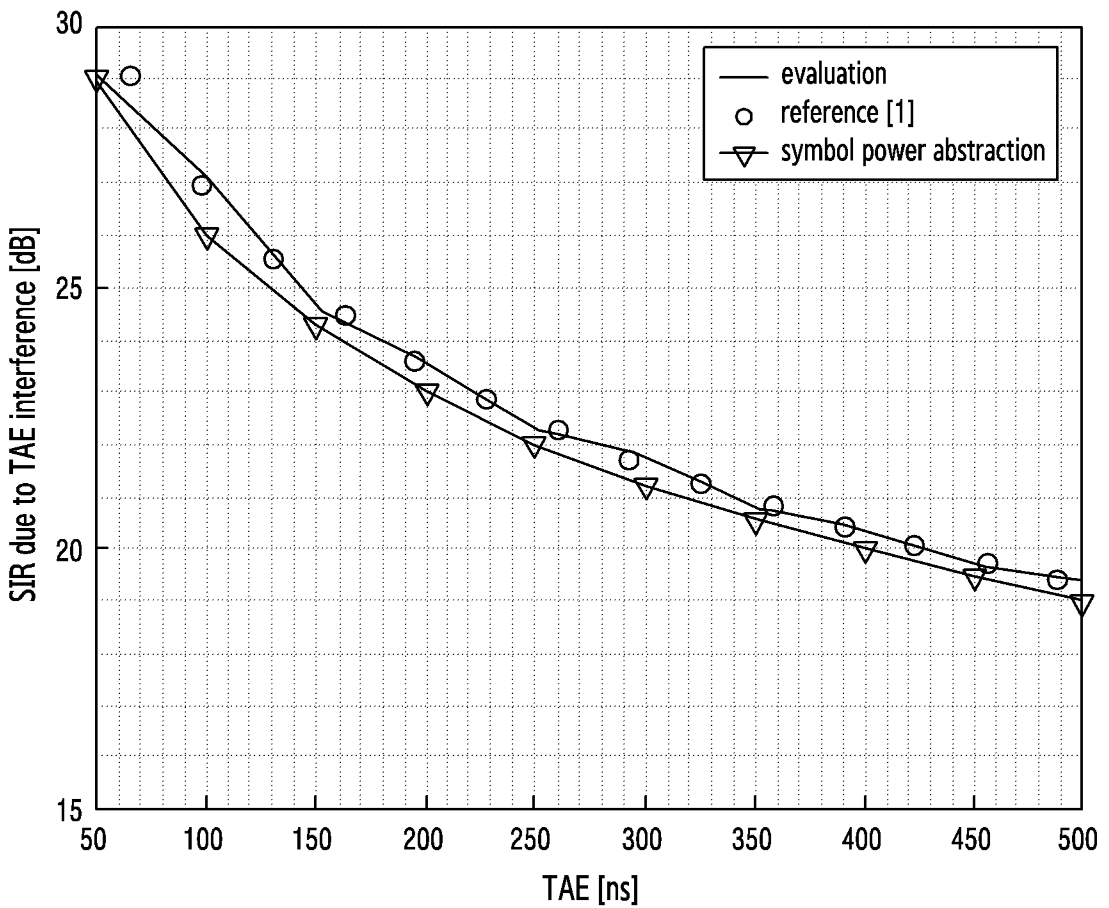
FIG. 8 is a graph illustrating performance based on TAE interference according to various embodiments.

FIG. 8 is a graph illustrating a comparison of a signal to interference ratio (SIR) value and evaluation results through a simulation if a sine model and a symbol power abstraction model are applied, with respect to the interference aspect disclosed in FIG. 7 according to various embodiments. The x axis of FIG. 8 may indicate the TAE, and the y axis may indicate the SIR due to the TAE interference. The TAE may be expressed based on ns, and the SIR due to the TAE interference may be expressed based on the dB.

Referring to FIG. 8, it may be identified that in-band interference occurs due to the TAE with the TAE if the LTE-NR DSS is applied through the evaluation results. In addition, it may be identified that the symbol power abstraction model well matches the actual evaluation results within 0.5 dB.

Given that $N(m, \sigma^2)$ is a normal distribution function with a mean m and a deviation $\sigma^2$, interference e due to the TAE may be assumed to be a signal $$e \sim N(0, \sigma_e^2).$$

At this time, $$\sigma_e^2$$

may be expressed as the following equation.

A relation of $$\sigma_e^2 = \frac{\Delta t}{N} \times \frac{\#\text{ of allocated } LTE\ REs \times EPRE}{\#\text{ of allocated } NR\ REs}$$

is established.

While the above relation assumes that the interference e due to the TAE is based on the case where the LTE symbol interferes with the NR symbol, the scope according to an embodiment of the present disclosure is not limited thereto, and the TAE interference includes the interference between the NR symbols having different numerologies and the interference of the NR symbol with the LTE symbol. Considering such a case, $$\sigma_e^2$$

may be determined based on the following equation.

$$\sigma_e^2 = \frac{\Delta t}{N} \times \frac{\#\text{ of allocated } REs \text{ of interference} \times EPRE}{\#\text{ of allocated } REs \text{ of desired source}} \quad \text{<Equation 5>}$$

In Equation 5, e denotes TAE interference information, Δt denotes an interference amount between the NR symbol having the first numerology and the NR symbol having the second numerology or an interference amount between the LTE symbol and the NR symbol, N denotes the FFT size, # of allocated REs of interference×EPRE denotes a product of the number of interfering symbol REs and the EPRE, and # of allocated REs of desired source denotes the number of REs for performing the beamforming.

Figure 9:
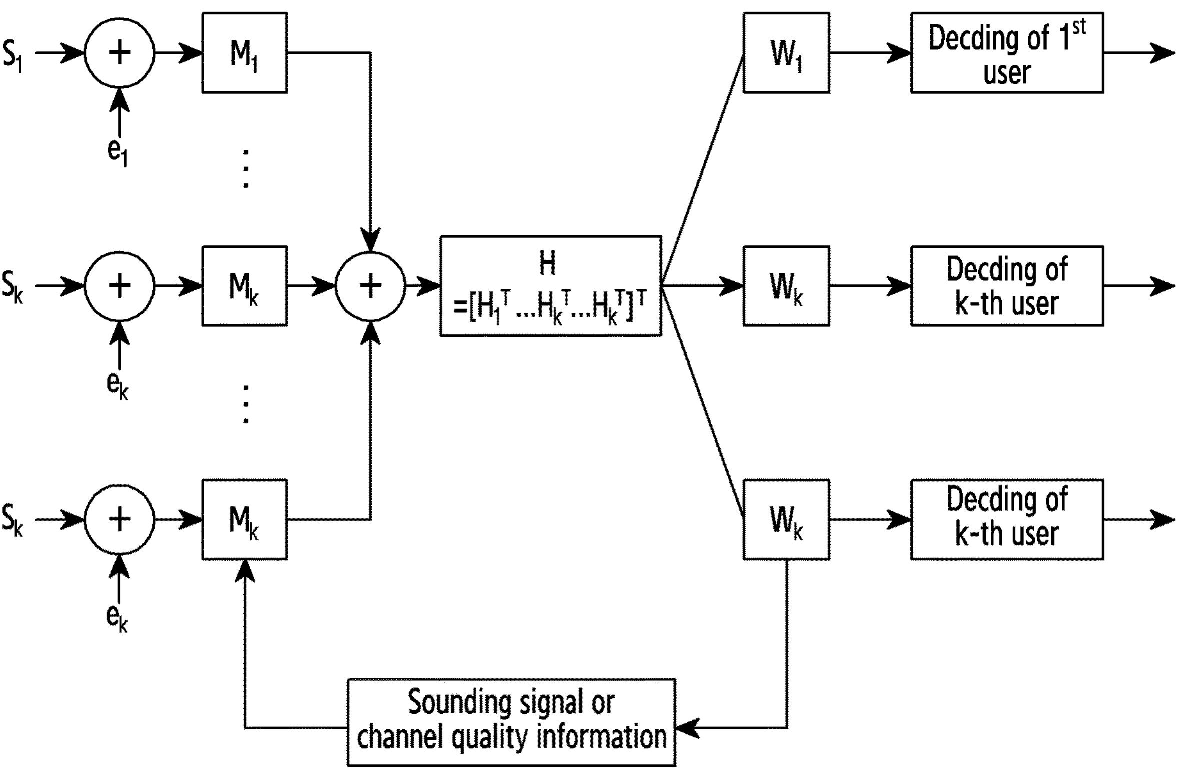
FIG. 9 is a diagram illustrating an example of a multi user (MU)-multiple input multiple output (MIMO) model according to various embodiments.

FIG. 9 is a diagram illustrating an example of a multi user (MU)-MIMO model according to various embodiments. Hereafter, a transmitter may be a device corresponding to a base station, a receiver is described as a device corresponding to a terminal, but embodiments of the present disclosure are not limited thereto. The embodiments of the present disclosure may be applied to uplink transmission as well as downlink transmission, transmissions between a network and network nodes, and transmission between a terminal and a terminal in the identical or similar manner.

In the MU-MIMO system, a receive signal $y_k$ of a k-th user may be expressed as the following equation.

$$y_k = W_k H_k M_k s_k + \underbrace{\sum_{l \neq k}^{K} W_k H_k M_l s_l}_{\text{multi-user interference}} + \underbrace{\sum_{l=1}^{K} W_k H_k M_l e_l}_{\text{TAE interference}} + W_k n_k \quad \text{<Equation 6>}$$

In Equation 6, $n_T$ denotes the number of antennas of the transmitter, $n_{R,k}$ denotes the number of receive antennas of a k-th user terminal, and $n_{L,k}$ denotes the number of transmission data layers of the k-th user.

Considering a general downlink environment of the wireless communication system, $n_T > n_{R,k} > n_{L,k}$ may be assumed, in the MU-MIMO model according to various embodiments of the present disclosure. K denotes the number of users to which the base station transmits a signal. $n_L$ denotes a sum of layers of K-ary users.

$$n_L = \sum_{k=1}^{K} n_{L,k},$$

and $n_T > n_L$ in general.

Meaning of each mathematical symbol in Equation 6 is as follows. $H \stackrel{\text{def}}{=}$ $$[H_1^T \ldots H_k^T \ldots H_K^T]^T$$

is $$\sum_{l=1}^{K} n_{R,l} \times n_T$$

channel matrix, $M_k$ is a $n_T \times n_{L,k}$ precoder of the k-th user, and $W_k$ is a $n_{R,k} \times n_{R,k}$ decoder of the k-th user. $e_k$ denotes a TAE interference signal of the k-th user, and $n_k$ denotes a noise signal of the k-th user. $e_k$ is a signal having the distribution of $e_k \sim \mathcal{N}(0, K_e, k)$, and $n_k$ is a signal having the distribution of $$n_k \sim N(0, \sigma_{n,k}^2 I).$$

Each channel $H_k$, k=1, . . . , K may be configured with channel information estimated at the base station based on a sounding signal of the k-th user terminal or channel quality information (CQI) of the terminal.

According to various embodiments of the present disclosure, the precoder $M_k$ of the k-th user may be selected in a $n_T \times n_{L,k}$ precoder $$v_{\overline{k}}$$

form corresponding to a null space of the $\Sigma_{l \neq k} n_{R,l} \times n_T$ channel defined as $$H_{\overline{k}}$$

to minimize/reduce interference excluding the k-th user.

A method for acquiring the null space from the channel matrix $$H_{\overline{k}} \overset{def}{=} [H_1^T \ldots H_{k-1}^T \; H_{k+1}^T \ldots H_K^T]^T$$

may include a solution which utilizes a right singular matrix after singular value decomposition (SVD) of $$H_{\overline{k}}.$$

A singular matrix $\Lambda_0 = [\Lambda_{\Sigma_{l \neq k} n_{R,l} \times \Sigma_{l \neq k} n_{R,l}} \; 0_{\Sigma_{l \neq k} n_{R,l} \times (n_T - \Sigma_{l \neq k} n_{R,l})}]$ may be acquired by decomposing with $$H_{\overline{k}} = U_0 \Lambda_0 V_0^H$$

by the SVD, which may be acquired by selecting $n_{L,k}$-ary row vectors from a matrix $V_0$ corresponding to $0_{\Sigma_{l \neq k} n_{R,l} \times (n_T - \Sigma_{l \neq k} n_{R,l})}$.

$$M_k = \underset{\substack{n_{L,k} \\ \text{corresponding to} \\ \text{null matrix } 0}}{\underbrace{\text{select}}} (V_0) \qquad \text{< Equation 7 >}$$

Another approach for calculating the null space is an inverse iteration scheme. Inverse power iteration calculates a least principal vector and may be calculated as $$v_{\overline{k},i+1} = \frac{(H_{\overline{k}} H_{\overline{k}}^H - \alpha I)^{-1} v_{\overline{k},i}}{\|(H_{\overline{k}} H_{\overline{k}}^H - \alpha I)^{-1} v_{\overline{k},i}\|}.$$

α is a regularization factor and may be set to $$\alpha = \frac{1}{\sigma_{e,k}^2}$$

if the TAE interference follows white Gaussian distribution, that is, if $$K_{e,k} = \sigma_{e,k}^2 I.$$

In an embodiment, the precoder $M_k$ may be set by sequentially selecting $n_{L,k}$-ary row vectors in the least principal eigen vector $$v_{\overline{k}}.$$

$$M_k = \underset{n_{L,k}}{\underbrace{\text{select}}}(v_{\overline{k}}) \qquad \text{< Equation 8 >}$$

In an embodiment, $M_k$ may be calculated as an inverse matrix form of the channel matrix H, wherein the applied precoder type is given by the following equation.

$$M_k = H_k^H (HH^H + \alpha I)^{-1} \qquad \text{< Equation 9 >}$$

In Equation 9, α is the regularization factor and may be set to $$\alpha = \frac{1}{\sigma_{e,k}^2}$$

if the TAE interference follows the white Gaussian distribution, that is, if $$K_{e,k} = \sigma_{e,k}^2 I.$$

The function of the regularization factor α may generate characteristics of the precoder in an average filtering form if the interference magnitude is considerable according to the magnitude of the TAE interference.

According to various embodiments of the present disclosure, if the precoder $$v_{\overline{k}}$$

is applied to Equation 4, the multi-user interference component of Equation 4 is nulled and accordingly Equation 4 may be calculated based on the following Equation 10.

$$y_k = W_k H_k M_k s_k + W_k H_k M_k e_k + W_k n_k \qquad \text{< Equation 10 >}$$

An achievable rate $$\tau_{y_k}$$

from Equation 10 may be calculated based on the following Equation 11.

$$\tau_{r_k} = \log\left(\det\left(I_{n_{R,k}} + W_k H_k M_k Q_k M_k^H H_k^H W_k^H \left(W_k K_k W_k^H\right)^{-1}\right)\right) \quad \text{<Equation 11>}$$

In Equation 11, $$Q_k = E\{s_k s_k^H\}, \text{ and } K_k = H_k M_k K_{e,k} M_k^H H_k^H + \sigma_{n,k}^2 I_{n_{R,k}}.$$

In an embodiment, the achievable rate $\tau_{y_k}$ from the receive signal $r_k = H_k M_k e_k + H_k M_k e_k + n_k$ before applying the decoder $W_k$ in Equation 10 may be expressed as the following equation.

$$\tau_{r_k} = \log\left(\det\left(I_{n_{R,k}} + H_k M_k Q_k M_k^H H_k^H K_k^{-1}\right)\right) = \log\left(\det\left(I_{n_{R,k}} + K_k^{-\frac{1}{2}} H_k M_k Q_k M_k^H H_k^H K^{-\frac{H}{2}}\right)\right) \quad \text{< Equation 12)}$$

If $$W_k = K_k^{-\frac{1}{2}}$$

is selected in Equation 11 and Equation 12, the decoder $W_k$ with $\tau_{y_k} = \tau_{r_k} = \tau_k$ may be obtained. Thus, an achievable weighted sum rate $$\tau = \sum_{k=1}^{K} a_k \tau_k$$

may be induced as the following equation.

$$\tau = \sum_{k=1}^{K} a_k \log\left(\det\left(I_{n_{R,k}} + K_k^{-\frac{1}{2}} H_k M_k Q_k M_k^H H_k^H K_k^{-\frac{H}{2}}\right)\right) = \log \prod_{k=1}^{K} \left(\det\left(I_{n_{R,k}} + K_k^{-\frac{1}{2}} H_k M_k Q_k M_k^H H_k^H K_k^{-\frac{H}{2}}\right)\right)^{a_k} \quad \text{< Equation 13 >}$$

According to various embodiments of the present disclosure, given that the number $n_{L,k}$ of the transmission layers of the k-th user is 1 for system performance analysis, Equation 4 may be developed into the following vector-type equation $$y_k = W_k h_{eff,k} s_k + z_k \quad \text{< Equation 14 >}$$

In Equation 14, since $$h_{eff,k} = h_k m_k,\ W_k = K_k^{-\frac{1}{2}}, \text{ and } z_k \sim N(0, I),\ E\{\|z_k^H z_k\|\} = 1.$$

$$\text{Assuming } K_{e,k} = \sigma_{e,k}^2 I,\ K_k = \sigma_{e,k}^2 h_{eff,k} h_{eff,k}^H + \sigma_{n,k}^2 I_{n_{R,k}}$$

$$\text{and } W_k = \frac{1}{\sigma_{n,k}^2}\left(I_{n_{R,k}} - \frac{\sigma_{e,k}^2 h_{eff,k} h_{eff,k}^H}{\sigma_{n,k}^2 + \sigma_{e,k}^2 \|h_{eff,k}\|^2}\right)$$

according to matrix inversion lemma.

As shown in Equation 14, if $$E\{\|z_k^H z_k\|\} = 1,$$

the SINR of the k-th user considering the TAE and the multi-user interference may be induced as the following equation. Herein, $E\{|s_k|^2\}=1$ is assumed.

$$\begin{aligned} \text{SINR}_k &= \|W_k h_{eff,k} s_k\|^2 \\ &= \frac{1}{\sigma_{n,k}^2} h_{eff,k}^H \left(I_{n_{R,k}} - \frac{\sigma_{e,k}^2 h_{eff,k} h_{eff,k}^H}{\sigma_{n,k}^2 + \sigma_{e,k}^2 \|h_{eff,k}\|^2}\right) h_{eff,k} \\ &= \frac{\|h_{eff,k}\|^2}{\sigma_{n,k}^2 + \sigma_{e,k}^2 \|h_{eff,k}\|^2} \end{aligned} \quad \text{< Equation 15 >}$$

Referring to Equation 15, it may be identified that the influence of the TAE interference affects the SINR along with the channel power.

The SINR disclosed in Equation 15 and the achievable weighted sum rate for the layer 1 from Equation 13 may be calculated as below.

$$\tau = \sum_{k=1}^{K} a_k \log(1 + \text{SINR}_k) = \log \prod_{k=1}^{K} \left(\frac{\sigma_{n,k}^2 + \left(1 + \sigma_{e,k}^2\right)\|h_k\|^2 m_k^H m_k}{\sigma_{n,k}^2 + \sigma_{e,k}^2 \|h_k\|^2 m_k^H m_k}\right)^{a_k} \quad \text{< Equation 16 >}$$

Figure 10:
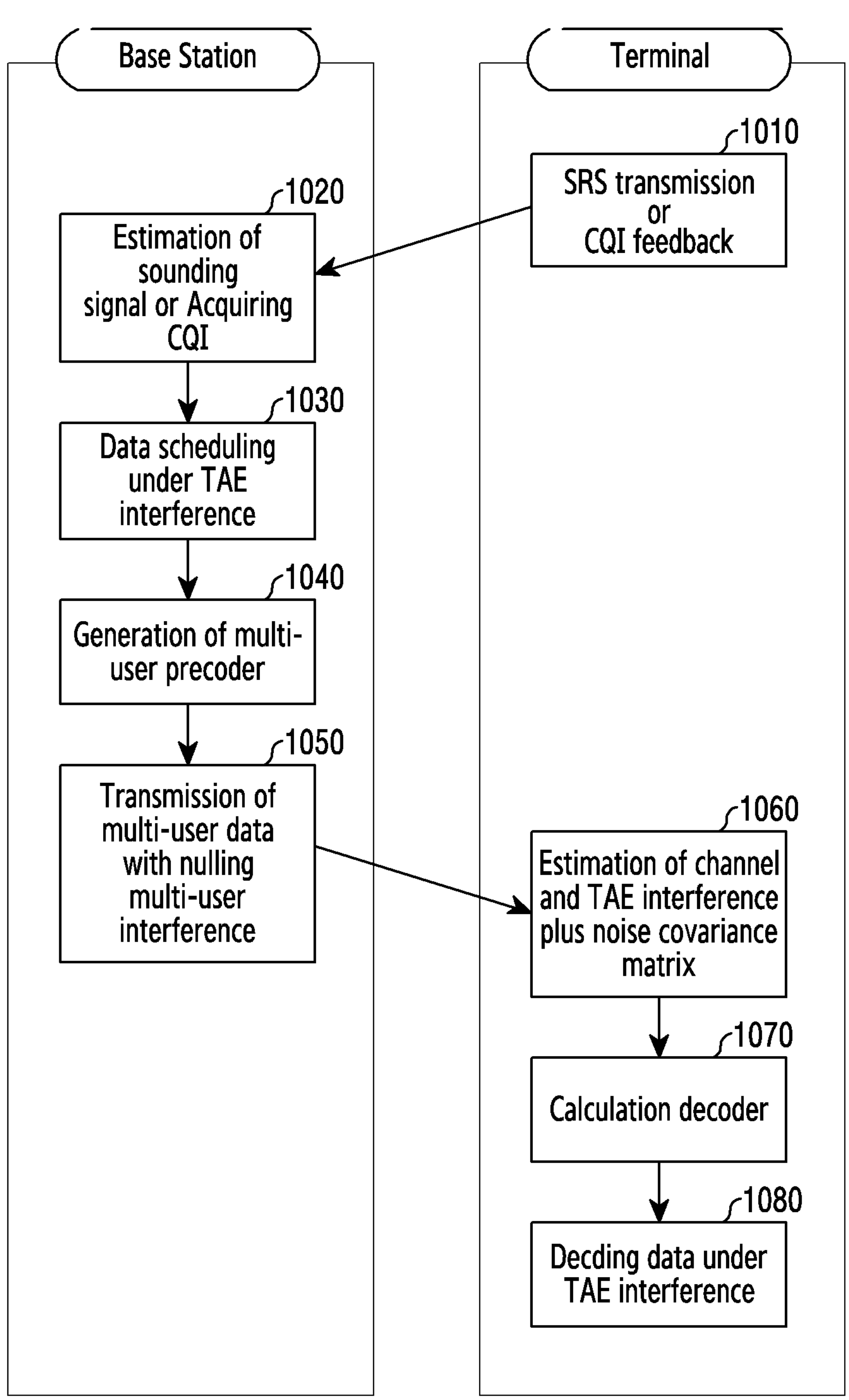
FIG. 10 is a diagram illustrating example signaling between a base station and a terminal according to various embodiments.

FIG. 10 is a diagram illustrating example signaling flows between a base station and a terminal according to various embodiments. The base station represents the base station 110 of FIG. 1. The terminal represents the terminal 120 and 130 of FIG. 1.

Referring to FIG. 10, in operation 1010, the terminal may transmit an SRS or a CQI feedback to the base station. In an embodiment, the terminal may transmit the SRS to the base station in operation 1010. The SRS may be used to estimate an uplink channel. The base station may perform scheduling according to the uplink channel and channel estimation for link adaptation based on the SRS. For example, the SRS may be used, if the network adjusts an uplink transmission timing according to an uplink timing-alignment procedure.

In an embodiment, the terminal may transmit the CQI to the base station in step 1010. Although not depicted in the drawing, the base station may transmit a reference signal before operation 1010. The reference signal transmitted by the base station to the terminal may include a CRS, and a CSI-RS. Based on the reference signal received from the base station, the terminal may measure a channel state. The terminal may measure the channel state, and transmit the CSI feedback information reflecting it to the base station. The CSI feedback information transmitted by the terminal to the base station may include at least one of the CQI, a precoding matrix indicator (PMI), or a rank indicator (RI).

In operation 1020, the base station may estimate the downlink channel or uplink channel state. For example, the base station may measure uplink channel information from the SRS received from the terminal. In addition, for example, the base station may measure downlink channel information from the CSI feedback information received from the terminal. In addition, for example, in a time division duplexing (TDD) based wireless communication system, the uplink channel and the downlink channel may have reciprocity. Due to this reciprocity, the uplink channel state and the downlink channel state may be similar. Hence, the base station may estimate the uplink channel state base on the estimated downlink channel state, or estimate the downlink channel state base on the estimated uplink channel state. The uplink channel estimation may use the SRS received from the terminal. The downlink channel estimation may use the CSI feedback information received from the terminal.

In operation 1030, the base station may perform data scheduling of the terminal based on the TAE interference. In so doing, the base station may consider the channel state estimated in step 1020. The TAE interference may be determined based on the following equation.

$$\approx I_{nr} \approx \frac{\Delta t}{N} \times \frac{1}{\mathrm{card}(S_{sym}^{N})} \sum_{n \in S_{sym}^{N}} \left(P_{ICI,n}^{L} + P_{ISI,n}^{L}\right) = \frac{\Delta t}{N} \times \frac{\#\text{ of allocated } LTE\ REs \times EPRE}{\#\text{ of allocated } NR\ REs} \quad \text{< Equation 4 >}$$

In Equation 4, $$P_{ICI,n}^{L}$$

denotes the symbol power generating the ICI in the n-th NR symbol, $$P_{ISI,n}^{L}$$

denotes the symbol power generating the ISI in the n-th NR symbol, $$\mathrm{card}(S_{sym}^{N})$$

denotes the number of the NR symbols, N denotes the FFT size, and # of allocated LTE REs×EPRE denotes the product of the number of the LTE REs and the EPRE.

In the MU-MIMO system, the receive signal $y_k$ of the k-th user may be expressed as the following equation.

$$y_k = W_k H_k M_k s_k + \underbrace{\sum_{l \neq k}^{K} W_k H_k M_l s_l}_{\text{multi-user interference}} + \underbrace{\sum_{l=1}^{K} W_k H_k M_l e_l}_{\text{TAE interference}} + W_k n_k \quad \text{< Equation 6 >}$$

In Equation 6, $n_T$ denotes the number of the antennas of the transmitter, $n_{R,k}$ denotes the number of the receive antennas of the k-th user terminal, and $n_{L,k}$ denotes the number of the transmission data layers of the k-th user.

Considering the general downlink environment of the wireless communication system, $n_T > n_{R,k} > n_{L,k}$ may be assumed, in the MU-MIMO model according to various embodiments of the present disclosure. K denotes the number of the users to which the base station transmits the signal. $n_L$ denotes the sum of the layers of the K-ary users.

$$N_L = \sum_{k=1}^{K} n_{L,k},$$

and $n_T > n_L$ in general. Meaning of each mathematical symbol in Equation 6 is as follows.

$$H \overset{def}{=} \left[H_1^T \ \ldots \ H_k^T \ \ldots \ H_K^T\right]^T$$

is $$\sum_{l=1}^{K} n_{R,k} \times n_T$$

channel matrix, $M_k$ is the $n_T \times n_{L,k}$ precoder of the k-th user, and $W_k$ is the $n_{R,k} \times n_{R,k}$ decoder of the k-th user. $e_k$ denotes the TAE interference signal of the k-th user, and $n_k$ denotes the noise signal of the k-th user. $e_k$ is the signal having the distribution of $e_k \sim \mathcal{N}(0, K_{e,k})$, and $n_k$ is the signal having the distribution of $$n_k \sim \mathcal{N}(0, \sigma_{n,k}^2 I).$$

Each channel $H_k$, k=1, . . . , K may be configured with channel information estimated at the base station based on the sounding signal of the k-th user terminal or the CQI of the terminal.

The base station may generate a multi-user precoder in operation 1040. In an embodiment, the precoder $M_k$ of the k-th user may be selected in the $n_T \times n_{L,k}$ precoder $$v_{\bar{k}}$$

form corresponding to the null space of the $\Sigma_{l \neq k} n_{R,l} \times n_T$ channel defined as $$H_{\bar{k}} \overset{def}{=} \left[H_1^T \ \ldots \ H_{k-1}^T H_{k+1}^T \ \ldots \ H_K^T\right]^T$$

to minimize/reduce the interference excluding the k-th user. The method for acquiring the null space from the channel matrix $$H_{\bar{k}}$$

may include the solution which utilizes the right singular matrix after the SVD of $$H_{\bar{k}}.$$

The singular matrix $\Lambda_0=[\Lambda_{\Sigma_{l\neq k}n_{R,l}\times\Sigma_{l\neq k}n_{R,l}}\ 0_{\Sigma_{l\neq k}n_{R,l}\times(n_T-\Sigma_{l\neq l}n_{R,l})}]$ may be acquired by decomposing with $$H_{\bar{k}}=U_0\Lambda_0V_0^H$$

by the SVD, which may be acquired by selecting the $n_{L,k}$-ary row vectors from the matrix $V_0$ corresponding to $0_{\Sigma_{l\neq k}n_{R,l}\times(n_T-\Sigma_{l\neq k}n_{R,l})}$.

In an embodiment, to acquire the precoder, the base station may use the inverse iteration scheme, in calculating the null space. The inverse power iteration calculates the least principal vector and may be calculated as $$v_{\bar{k},i+1}=\frac{(H_{\bar{k}}H_{\bar{k}}^H-\alpha I)^{-1}v_{\bar{k},i}}{\|(H_{\bar{k}}H_{\bar{k}}^H-\alpha I)^{-1}v_{\bar{k},i}\|}.$$

α is the regularization factor and may be set to $$\alpha=\frac{1}{\sigma_{e,k}^2}$$

if the TAE interference follows the white Gaussian distribution, that is, if $$K_{e,k}=\sigma_{e,k}^2I.$$

In an embodiment, the precoder $M_k$ may be set by sequentially selecting the $n_{L,k}$-ary row vectors in the least principal eigen vector $$v_{\bar{k}}.$$

$$M_k=\underset{n_{L,k}}{\underline{\text{select}}}(v_{\bar{k}}) \quad \text{< Equation 8 >}$$

In an embodiment, $M_k$ may be calculated as the inverse matrix form of the channel matrix H, wherein the applied precoder type is given by the following equation.

$$M_k=H_k^H(HH^H+\alpha I)^{-1} \quad \text{< Equation 9 >}$$

In Equation 9, a is the regularization factor and may be set to $$\alpha=\frac{1}{\sigma_{e,k}^2}$$

if the TAE interference follows the white Gaussian distribution, that is, if $$K_{e,k}=\sigma_{e,k}^2I.$$

The function of the regularization factor α may generate the precoder characteristics in the average filtering form if the interference magnitude is considerable according to the magnitude of the TAE interference.

In operation 1050, the base station may transmit to the terminal the multi-user data with the nulling multi-user interference. According to various embodiments of the present disclosure, if the precoder calculated in step 1040 is applied, the multi-user interference component of Equation 4 is nulled and accordingly Equation 4 may be calculated based on the following Equation 10.

$$y_k=W_kH_kM_ks_k+W_kH_kM_ke_k+W_kn_k \quad \text{< Equation 10 >}$$

In operation 1060, the terminal may estimate the channel, estimate the TAE interference and estimate a noise covariance matrix, with respect to the received multi-user data. The terminal may calculate the decoder in operation 1070. In so doing, the channel, the TAE, the noise estimated in step 1060 may be considered.

In an embodiment, the achievable rate $\tau_{y_k}$ from the receive signal $r_k=H_k\ M_k\ s_k+H_k\ M_k\ e_k+n_k$ before the base station applies the decoder $W_k$ in Equation 10 may be expressed as the following equation.

$$\tau_{r_k}=\log(\det(I_{n_{R,k}}+H_kM_kQ_kM_k^HH_k^HK_k^{-1}))=\log\left(\det\left(I_{n_{R,k}}+K_k^{-\frac{1}{2}}H_kM_kQ_kM_k^HH_k^HK_k^{-\frac{H}{2}}\right)\right) \quad \text{<Equation 12)}$$

If $$W_k=K_k^{-\frac{1}{2}}$$

is selected in Equation 11 and Equation 12, the decoder $W_k$ with $\tau_{y_k}=\tau_{r_k}=\tau_k$ may be obtained. Thus, the achievable weighted sum rate $$\tau=\sum_{k=1}^K a_k\tau_k$$

may be induced as the following equation.

$$\tau=\sum_{k=1}^K a_k\log\left(\det\left(I_{n_{R,k}}+K_k^{-\frac{1}{2}}H_kM_kQ_kM_k^HH_k^HK_k^{-\frac{H}{2}}\right)\right)=\log\prod_{k=1}^K\left(\det\left(I_{n_{R,k}}+K_k^{-\frac{1}{2}}H_kM_kQ_kM_k^HH_k^HK_k^{-\frac{H}{2}}\right)\right)^{a_k} \quad \text{<Equation 13>}$$

In an embodiment, given that the number $n_{L,k}$ of the transmission layers of the k-th user is 1 for the system performance analysis, Equation 4 may be developed into the following vector-type equation $$y_k=W_kh_{eff,k}s_k+z_k \quad \text{< Equation 14 >}$$

In Equation 14, since $$h_{eff,k}=h_k m_k,\ W_k=K_k^{-\frac{1}{2}},$$

$$\text{and } z_k\sim N(0,I),\ E\{\|z_k^H z_k\|\}=1.$$

$$\text{Assuming } K_{e,k}=\sigma_{e,k}^2 I,\ K_k=\sigma_{e,k}^2 h_{eff,k}h_{eff,k}^H+\sigma_{n,k}^2 I_{n_{R,k}}$$

$$\text{and } W_k=\frac{1}{\sigma_{n,k}^2}\left(I_{n_{R,k}}-\frac{\sigma_{e,k}^2 h_{eff,k}h_{eff,k}^H}{\sigma_{n,k}^2+\sigma_{e,k}^2\|h_{eff,k}\|^2}\right)$$

according to the matrix inversion lemma.

As shown in Equation 14, if $$E\{\|z_k^H z_k\|\}=1,$$

the SINR of the k-th user considering the TAE and the multi-user interference may be induced as the following equation. Herein, $E\{(|s_k|^2\}=1$ is assumed.

<Equation 15>

$$\begin{aligned}\text{SINR}_k&=\|W_k h_{eff,k}s_k\|^2\\&=\frac{1}{\sigma_{n,k}^2}h_{eff,k}^H\left(I_{n_{R,k}}-\frac{\sigma_{e,k}^2 h_{eff,k}h_{eff,k}^H}{\sigma_{n,k}^2+\sigma_{e,k}^2\|h_{eff,k}\|^2}\right)h_{eff,k}\\&=\frac{\|h_{eff,k}\|^2}{\sigma_{n,k}^2+\sigma_{e,k}^2\|h_{eff,k}\|^2}\end{aligned}$$

Referring to Equation 15, it may be identified that the influence of the TAE interference affects the SINR along with the channel power.

The SINR disclosed in Equation 15 and the achievable weighted sum rate for the layer 1 from Equation 13 may be calculated as below.

<Equation 16>

$$\tau=\sum_{k=1}^{K}a_k\log(1+\text{SINR}_k)=\log\prod_{k=1}^{K}\left(\frac{\sigma_{n,k}^2+(1+\sigma_{e,k}^2)\|h_k\|^2 m_k^H m_k}{\sigma_{n,k}^2+\sigma_{e,k}^2\|h_k\|^2 m_k^H m_k}\right)^{a_k}$$

In operation 1080, the terminal may decode the received multi-user data based on the estimated TAE interference. In so doing, the terminal may use the decoder calculated in operation 1070. Using the decoder obtained in consideration of the TAE interference, the interference which may occur due the TAE resulting from the coexistence of the LTE and the NR may be efficiently controlled.

Figure 11A:
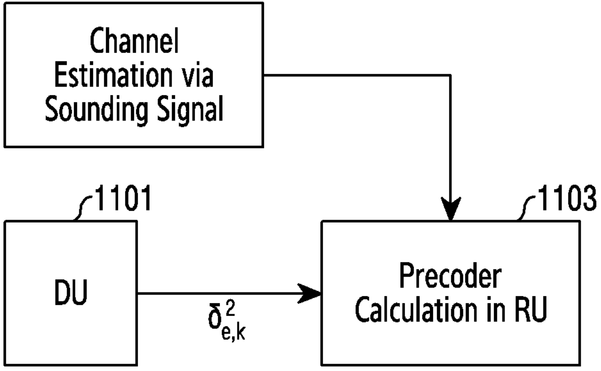
FIGS. 11A and 11B are diagrams illustrating example operations of a DU and an RU according to various embodiments.
Figure 11B:
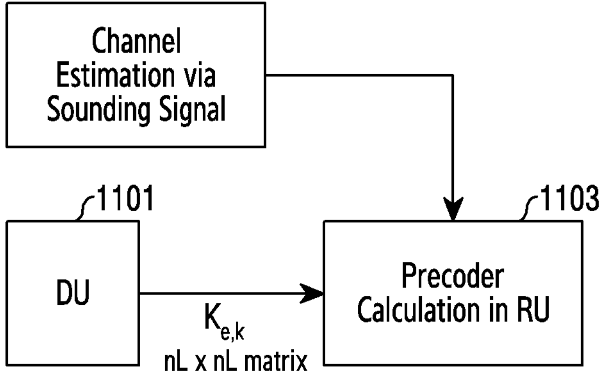

FIGS. 11A and 11B are diagrams illustrating example operations of a DU and an RU according to various embodiments.

As shown in FIG. 1B, the NR base station may have the structure split into the DU and the RU in function. FIGS. 11A and 11B illustrate the operations of the DU and the RU for controlling the interference due to the TAE resulting from the NR-LTE DSS, in the function split structure.

According to various embodiments of the present disclosure, in the function split structure between the DU and the RU, the DU and the RU may calculate a precoder reflecting the TAE. The DU may calculate the correlation matrix $$\sigma_{e,k}^2$$

or $K_{e,k}$ which is the TAE interference power and provide it to the RU to calculate the precoder reflecting the TAE. The TAE interference power, which is the value calculated based on the allocation resource information as shown in Equation 4 and Equation 10, may be calculated at the DU.

If the DU calculates and provides the TAE interference power value to the RU, the RU may calculate the optimal precoder considering the TAE as shown in Equation 10.

The TAE interference correlation matrix may be set by utilizing zero forcing (ZF) MIMO transmission defined in section type 5 and 6 of the ORAN standard. The ORAN section type 5 may include an interface relate to the scheduled user index. In other words, the section type 5 may be used to transmit the UE scheduling information, such that the UE may calculate a beamforming weight in real time. The section type 6 may include UE channel information exchanged between the DU and the RU or interface information of the SRS. In other words, the section type 6 may be used to periodically transmit the UE channel information such that the UE may calculate the beamforming weight in real time.

In an embodiment, the DU and the RU may calculate the precoder using $$\sigma_{e,k}^2$$

as shown in FIG. 11A. The DU may transmit $$\sigma_{e,k}^2$$

to the RU using the section type 5. Thus, the RU may generate a ZF-MIMO weight.

In an embodiment, the DU and the RU may calculate the precoder using $K_{e,k}$ as shown in FIG. 11B. The DU may transmit $K_{e,k}$ to the RU using the section type 5. Thus, the RU may generate a ZF-MIMO weight.

A method operating of a base station according to various example embodiments of the present disclosure may include: receiving channel information from at least one terminal, obtaining channel interference information based on the channel information, obtaining a precoder based on the channel interference information, and transmitting a transmit signal to the at least one terminal based on the precoder, the channel interference information may include timing alignment error (TAE) interference and multi-user interference, and the TAE interference may be determined based on a number of first radio access technology (RAT) symbols and a number of second RAT symbols allocated to the transmit signal.

In an example embodiment, the TAE interference may include at least one of interference between a new radio (NR) symbol having a first numerology and an NR symbol having a second numerology, and interference between an LTE symbol and an NR symbol, the TAE interference may follow a normal distribution function $$e\sim N(0,\sigma_e^2)$$

with a mean 0 and a deviation $$\sigma_e^2,$$

and e may denote the TAE interference information.

In an example embodiment, the deviation $$\sigma_e^2$$

may be determined based on the following equation.

$$\sigma_e^2 = \frac{\Delta t}{N} \times \frac{\#\text{ of allocated } REs \text{ of interference} \times EPRE}{\#\text{ of allocated } REs \text{ of desired resource}}$$

e denotes the TAE interference information, Δt denotes an interference amount between the NR symbol having the first numerology and the NR symbol having the second numerology or an interference amount between the LTE symbol and the NR symbol, N denotes a fast Fourier transform (FFT) size, # of allocated REs of interference×EPRE denotes a product of the number of interfering symbol resource elements (REs) and the energy per resource element (EPRE), and # of allocated REs of desired source denotes the number of REs for performing beamforming.

In an example embodiment, obtaining the precoder may include nulling the multi-user interference.

In an example embodiment, obtaining the precoder may include obtaining a channel matrix based on the channel information, and identifying a null space of the channel matrix.

In an example embodiment, identifying the null space of the channel matrix may be identified based on a right singular matrix acquired by performing singular value decomposition (SVD) on the channel matrix.

In an example embodiment, the channel information may include at least one of a channel quality information (CQI) or a sounding reference signal (SRS).

A method of operating a terminal according to various example embodiments of the present disclosure may include: transmitting channel information to a base station, receiving a signal from the base station, obtaining a decoder based on channel interference information determined based on the channel information, and decoding the signal based on the decoder, the channel interference information may include timing alignment error (TAE) interference and multi-user interference, and the TAE interference may be determined based on a number of first radio access technology (RAT) symbols and a number of second RAT symbols allocated to the transmit signal.

In an example embodiment, the TAE interference may include at least one of interference between a new radio (NR) symbol having a first numerology and an NR symbol having a second numerology, and interference between an LTE symbol and an NR symbol, the TAE interference may follow a normal distribution function $$e \sim N(0, \sigma_e^2)$$

with a mean 0 and a deviation $$\sigma_e^2,$$

and e may denote the TAE interference information.

In an example embodiment, the deviation $$\sigma_e^2$$

may be determined based on the following equation.

$$\sigma_e^2 = \frac{\Delta t}{N} \times \frac{\#\text{ of allocated } REs \text{ of interference} \times EPRE}{\#\text{ of allocated } REs \text{ of desired resource}}$$

e denotes the TAE interference information, Δt denotes an interference amount between the NR symbol having the first numerology and the NR symbol having the second numerology or an interference amount between the LTE symbol and the NR symbol, N denotes a fast Fourier transform (FFT) size, # of allocated REs of interference×EPRE denotes a product of the number of interfering symbol resource elements (REs) and the energy per resource element (EPRE), and # of allocated REs of desired source denotes the number of REs for performing beamforming.

In an example embodiment, the channel information may include at least one of a channel quality information (CQI) or a sounding reference signal (SRS).

A method of operating a DU according to various example embodiments of the present disclosure may include: obtaining channel interference information based on channel information, obtaining a precoder based on the channel interference information, and transmitting the precoder to a radio unit (RU), the channel interference information may include timing alignment error (TAE) interference and multi-user interference, the TAE interference may be determined based on a number of first radio access technology (RAT) symbols and a number of second RAT symbols allocated to the transmit signal, and the channel information may be received from at least one terminal.

In an example embodiment, the TAE interference may include at least one of interference between an NR symbol having a first numerology and a new radio (NR) symbol having a second numerology, and interference between an LTE symbol and an NR symbol, the TAE interference may follow a normal distribution function $$e \sim N(0, \sigma_e^2)$$

with a mean 0 and a deviation $$\sigma_e^2,$$

and e may denote the TAE interference information.

In an example embodiment, the deviation $$\sigma_e^2$$

may be determined based on the following equation.

$$\sigma_e^2 = \frac{\Delta t}{N} \times \frac{\#\text{ of allocated } REs \text{ of interference} \times EPRE}{\#\text{ of allocated } REs \text{ of desired resource}}$$

e denotes the TAE interference information, Δt denotes an interference amount between the NR symbol having the first numerology and the NR symbol having the second numerology or an interference amount between the LTE symbol and the NR symbol, N denotes a fast Fourier transform (FFT) size, # of allocated REs of interference×EPRE denotes a product of the number of interfering symbol resource elements (REs) and the energy per resource element (EPRE), and # of allocated REs of desired source denotes the number of REs for performing beamforming.

An apparatus of a base station according to various example embodiments of the present disclosure may include: a transciever, and a processor, the processor may be configured to: receive channel information from at least one terminal, obtain channel interference information based on the channel information, obtain a precoder based on the channel interference information, and control the transceiver to transmit a transmit signal to the at least one terminal based on the precoder, the channel interference information may include timing alignment error (TAE) interference and multi-user interference, and the TAE interference may be determined based on a number of first radio access technology (RAT) symbols and a number of second RAT symbols allocated to the transmit signal.

In an example embodiment, the TAE interference may include at least one of interference between a new radio (NR) symbol having a first numerology and an NR symbol having a second numerology, and interference between an LTE symbol and an NR symbol, the TAE interference may follow a normal distribution function $$e \sim N(0, \sigma_e^2)$$

with a mean 0 and a deviation $$\sigma_e^2,$$

and e may denote the TAE interference information.

In an example embodiment, the deviation $$\sigma_e^2$$

may be determined based on the following equation.

$$\sigma_e^2 = \frac{\Delta t}{N} \times \frac{\#\text{ of allocated } REs \text{ of interference} \times EPRE}{\#\text{ of allocated } REs \text{ of desired resource}}$$

e denotes the TAE interference information, Δt denotes an interference amount between the NR symbol having the first numerology and the NR symbol having the second numerology or an interference amount between the LTE symbol and the NR symbol, N denotes a fast Fourier transform (FFT) size, # of allocated REs of interference×EPRE denotes a product of the number of interfering symbol resource elements (REs) and the energy per resource element (EPRE), and # of allocated REs of desired source denotes the number of REs for performing beamforming.

In an example embodiment, to obtain the precoder, the processor may be configured to null the multi-user interference.

In an example embodiment, to obtain the precoder, the processor may be configured to obtain a channel matrix based on the channel information, and identify a null space of the channel matrix.

In an example embodiment, to identify the null space of the channel matrix, the processor may be configured to identify a null space of the channel based on a right singular matrix acquired by performing singular value decomposition (SVD) on the channel matrix.

In an example embodiment, the channel information may include at least one of a channel quality information (CQI) or a sounding reference signal (SRS).

An apparatus of a terminal according to various example embodiments of the present disclosure may include: a transciever, and a processor, the processor may be configured to: control the transceiver to transmit channel information to a base station, receive a signal from the base station, obtain a decoder based on channel interference information determined based on the channel information, and decode the signal based on the decoder, the channel interference information may include timing alignment error (TAE) interference and multi-user interference, and the TAE interference may be determined based on a number of first radio access technology (RAT) symbols and a number of second RAT symbols allocated to the transmit signal.

In an example embodiment, the TAE interference may include at least one of interference between a new radio (NR) symbol having a first numerology and an NR symbol having a second numerology, and interference between an LTE symbol and an NR symbol, the TAE interference may follow a normal distribution function $$e \sim N(0, \sigma_e^2)$$

with a mean 0 and a deviation $$\sigma_e^2,$$

and e may denote the TAE interference information.

In an example embodiment, the deviation $$\sigma_e^2$$

may be determined based on the following equation.

$$\sigma_e^2 = \frac{\Delta t}{N} \times \frac{\#\text{ of allocated } REs \text{ of interference} \times EPRE}{\#\text{ of allocated } REs \text{ of desired resource}}$$

e denotes the TAE interference information, Δt denotes an interference amount between the NR symbol having the first numerology and the NR symbol having the second numerology or an interference amount between the LTE symbol and the NR symbol, N denotes a fast Fourier transform (FFT) size, # of allocated REs of interference×EPRE denotes a product of the number of interfering symbol resource elements (REs) and the energy per resource element (EPRE), and # of allocated REs of desired source denotes the number of REs for performing beamforming.

An apparatus of a digital unit (DU) according to various example embodiments of the present disclosure may include: a transciever, and a processor, the processor may be configured to: obtain channel interference information based on channel information, obtain a precoder based on the channel interference information, and control the transceiver to transmit the precoder to a radio unit (RU), the channel interference information may include timing alignment error (TAE) interference and multi-user interference, the TAE interference may be determined based on a number of first radio access technology (RAT) symbols and a number of second RAT symbols allocated to the transmit signal, and the channel information may be received from at least one terminal.

The methods according to the various example embodiments described in the claims or the disclosure of the present disclosure may be implemented in software, hardware, or a combination of hardware and software.

As for the software, a non-transitory computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. In addition, a plurality of memories may be included.

The program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the various example embodiments of the present disclosure, the elements included in the present disclosure are expressed in a singular or plural form. However, the singular or plural expression is appropriately selected according to a situation for the convenience of explanation, the present disclosure is not limited to a single element or a plurality of elements, the elements expressed in the plural form may be configured as a single element, and the elements expressed in the singular form may be configured as a plurality of elements.

While the disclosure has been illustrated and described with reference to various example embodiments, it will be understood that the various example embodiments are intended to be illustrative, not limiting. It will also be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method performed by a base station (BS) in a wireless communication system, the method comprising:

receiving, from at least one terminal, channel information including at least one of a channel quality indicator (CQI) or a sounding reference signal (SRS);

obtaining channel interference information including timing alignment error (TAE) interference information and multi-user interference information based on the channel information;

obtaining a precoder based on the channel interference information; and transmitting a signal to the at least one terminal based on the precoder, wherein the TAE interference information is determined based on an interference amount between symbols of first radio access technology (RAT) and symbols of second RAT allocated to the signal.

2. The method of claim 1, wherein the first RAT is one of a new radio (NR) or a long-term evolution (LTE) and the second RAT is one of the NR or the LTE, and wherein the TAE interference information follows a normal distribution function $$e \sim N(0, \sigma_e^2)$$

with a mean 0 and a deviation $$\sigma_e^2,$$

and e denotes the TAE interference information.

3. The method of claim 2, wherein the deviation $$\sigma_e^2$$

is determined based on the following equation:

$$\sigma_e^2 = \frac{\Delta t}{N} \times \frac{\#\text{ of allocated } REs \text{ of interference} \times EPRE}{\#\text{ of allocated } REs \text{ of desired resource}}$$

where e denotes the TAE interference information, Δt denotes the interference amount between the symbols of the first RAT with a first numerology and the symbols of the second RAT with a second numerology, N denotes a fast Fourier transform (FFT) size, # of allocated REs of interference×EPRE denotes a product of a number of interfering symbol resource elements (REs) and an energy per resource element (EPRE), and # of allocated REs of desired resource denotes a number of REs for performing beamforming.

4. The method of claim 1, wherein the obtaining of the precoder comprises:

nulling the multi-user interference information.

5. The method of claim 1, wherein the obtaining of the precoder comprises:

obtaining a channel matrix based on the channel information; and identifying a null space of the channel matrix.

6. The method of claim 5, wherein the identifying of the null space of the channel matrix is identified based on a right singular matrix acquired by performing singular value decomposition (SVD) on the channel matrix.

7. A method performed by a terminal in a wireless communication system, the method comprising:

transmitting, to a base station (BS), channel information including at least one of a channel quality indicator (CQI) or a sounding reference signal (SRS);

receiving a signal from the BS;

obtaining a decoder based on channel interference information determined based on the channel information; and decoding the signal based on the decoder, wherein the channel interference information comprises timing alignment error (TAE) interference information and multi-user interference information, and wherein the TAE interference information is determined based on an interference amount between symbols of first radio access technology (RAT) and symbols of second RAT allocated to the signal.

8. The method of claim 7, wherein the first RAT is one of a new radio (NR) or a long-term evolution (LTE) and the second RAT is one of the NR or the LTE, and wherein the TAE interference information follows a normal distribution function $$e \sim N(0, \sigma_e^2)$$

with a mean 0 and a deviation $$\sigma_e^2,$$

and e denotes the TAE interference information.

9. The method of claim 8, wherein the deviation $$\sigma_e^2$$

is determined based on the following equation:

$$\sigma_e^2 = \frac{\Delta t}{N} \times \frac{\text{\# of allocated } REs \text{ of interference} \times EPRE}{\text{\# of allocated } REs \text{ of desired resource}}$$

where e denotes the TAE interference information, Δt denotes the interference amount between the symbols of the first RAT with a first numerology and the symbols of the second RAT with a second numerology, N denotes a fast Fourier transform (FFT) size, # of allocated REs of interference x EPRE denotes a product of a number of interfering symbol resource elements (REs) and an energy per resource element (EPRE), and # of allocated REs of desired resource denotes a number of REs for performing beamforming.

10. A method performed by a digital unit (DU) in a wireless communication system, the method comprising:

obtaining channel interference information based on channel information including at least one of a channel quality indicator (CQI) or a sounding reference signal (SRS);

obtaining a precoder based on the channel interference information; and transmitting the precoder to a radio unit (RU), wherein TAE interference information is determined based on an interference amount between symbols of first radio access technology (RAT) and symbols of second RAT allocated to a transmit signal, and wherein the channel information is received from at least one terminal.

11. The method of claim 10, wherein the first RAT is one of a new radio, NR, or a long-term evolution, LTE, and the second RAT is one of the NR or the LTE, and wherein the TAE interference information follows a normal distribution function $$e \sim N(0, \sigma_e^2)$$

with a mean 0 and a deviation $$\sigma_e^2,$$

and e denotes the TAE interference information.

12. The method of claim 11, wherein the deviation $$\sigma_e^2$$

is determined based on the following equation:

$$\sigma_e^2 = \frac{\Delta t}{N} \times \frac{\text{\# of allocated } REs \text{ of interference} \times EPRE}{\text{\# of allocated } REs \text{ of desired resource}}$$

where e denotes the TAE interference information, Δt denotes the interference amount between the symbols of the first RAT with a first numerology and the symbols of the second RAT with a second numerology, N denotes a fast Fourier transform (FFT) size, # of allocated REs of interference x EPRE denotes a product of a number of interfering symbol resource elements (REs) and an energy per resource element (EPRE), and # of allocated REs of desired resource denotes a number of REs for performing beamforming.

13. A base station comprising:

a transceiver; and a processor; and memory storing instructions that, when executed by the processor, cause the base station to:

receive, from at least one terminal, channel information including at least one of a channel quality indicator (CQI) or a sounding reference signal (SRS), obtain channel interference information including timing alignment error (TAE) interference information and multi-user interference information based on the channel information, obtain a precoder based on the channel interference information, and transmit a signal to the at least one terminal based on the precoder, wherein the TAE interference information is determined based on an interference amount between symbols of first radio access technology (RAT) and symbols of second RAT allocated to the signal.

14. The BS of claim 13, wherein the first RAT is one of a new radio, NR, or a long-term evolution, LTE, and the second RAT is one of the NR or the LTE, and wherein the TAE interference information follows a normal distribution function $$\sim N(0, \sigma_e^2)$$

with a mean 0 and a deviation $$\sigma_e^2,$$

and e denotes the TAE interference information.

15. The BS of claim 14, wherein the deviation $$\sigma_e^2$$

is determined based on the following equation:

$$\sigma_e^2 = \frac{\Delta t}{N} \times \frac{\#\text{ of allocated } REs \text{ of interference} \times EPRE}{\#\text{ of allocated } REs \text{ of desired resource}}$$

where e denotes the TAE interference information, Δt denotes the interference amount between the symbols of the first RAT with a first numerology and the symbols of the second RAT with a second numerology, N denotes a fast Fourier transform (FFT) size, # of allocated REs of interference x EPRE denotes a product of a number of interfering symbol resource elements (REs) and an energy per resource element (EPRE), and # of allocated REs of desired resource denotes a number of REs for performing beamforming.

16. The BS of claim 13, wherein the memory comprises instructions that, when executed by the processor, cause the BS to null the multi-user interference information.

17. The BS of claim 13, wherein the memory comprises instructions that, when executed by the processor, cause the BS to:

obtain a channel matrix based on the channel information, and identify a null space of the channel matrix.

18. The BS of claim 17, wherein the memory comprises instructions that, when executed by the processor, cause the BS to: identify a null space of the channel matrix based on a right singular matrix acquired by performing singular value decomposition (SVD) on the channel matrix.

19. A terminal comprising:

a transceiver; and a processor; and memory storing instructions that, when executed by the processor, cause the terminal to:

transmit, to a base station (BS), channel information including at least one of a channel quality indicator (CQI) or a sounding reference signal (SRS), receive a signal from the BS, obtain a decoder based on channel interference information determined based on the channel information, and decode the signal based on the decoder, wherein the channel interference information comprises timing alignment error (TAE) interference information and multi-user interference information, and wherein the TAE interference information is determined based on an interference amount between symbols of first radio access technology (RAT) and symbols of second RAT allocated to the signal.

* * * * *